Figure 1:
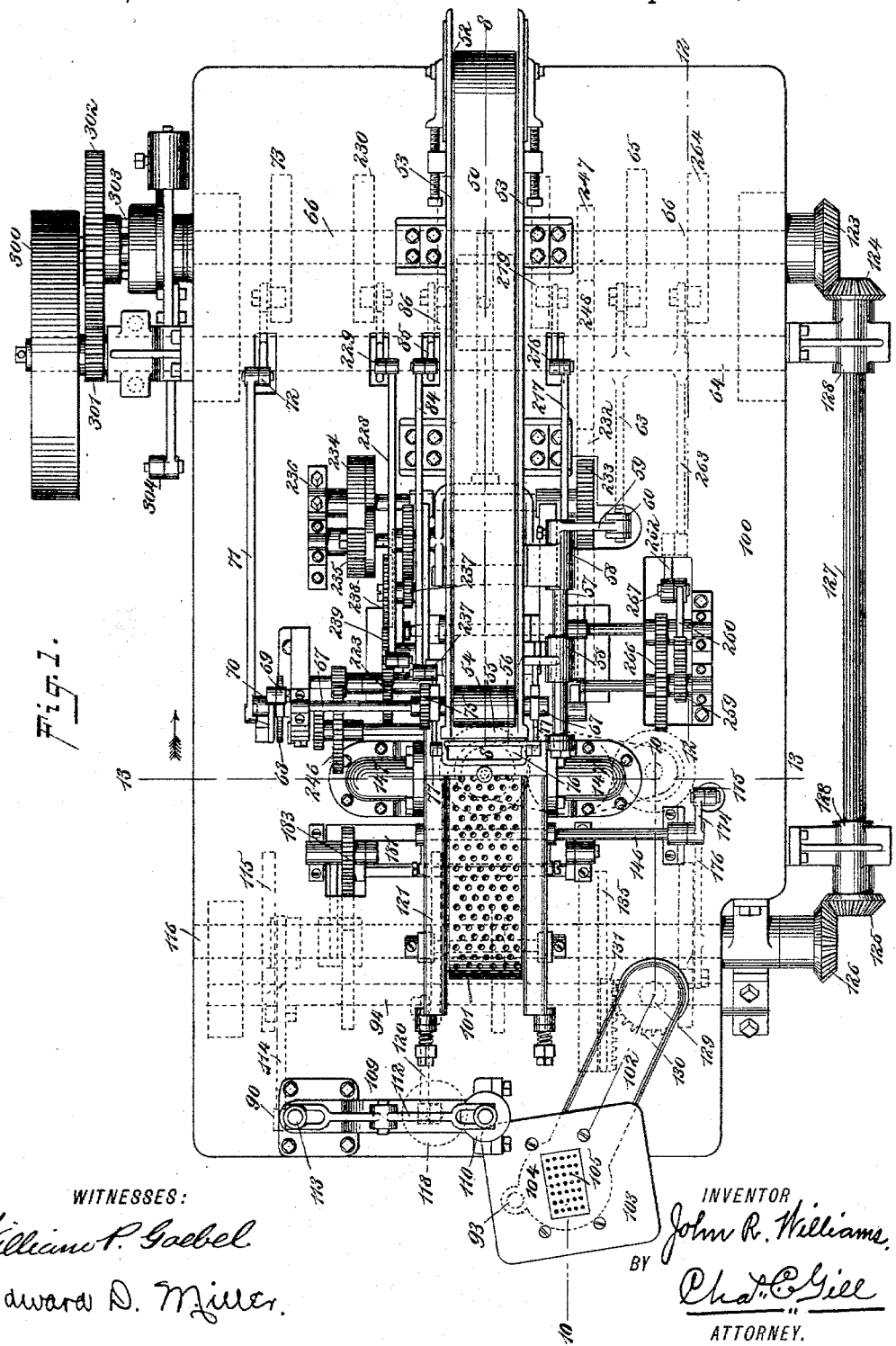

(No Model.) 15 Sheets—Sheet 1.

J. R. WILLIAMS.
CIGARETTE MAKING MACHINE.

No. 589,883. Patented Sept. 14, 1897.

WITNESSES:
William P. Gaebel
Edward D. Miller

INVENTOR
John R. Williams
BY
Chas. C. Gill
ATTORNEY.

(No Model.) 15 Sheets—Sheet 3.

J. R. WILLIAMS.
CIGARETTE MAKING MACHINE.

No. 589,883. Patented Sept. 14, 1897.

WITNESSES:
William P. Goebel
Edward W. Miller

INVENTOR
John R. Williams,
BY
Chas. C. Gill
ATTORNEY.

(No Model.) 15 Sheets—Sheet 4.

J. R. WILLIAMS.
CIGARETTE MAKING MACHINE.

No. 589,883. Patented Sept. 14, 1897.

WITNESSES:
William P. Goebel
Edward D. Miller

INVENTOR
John R. Williams,
BY Chas. C. Gill
ATTORNEY.

(No Model.)  15 Sheets—Sheet 5.
J. R. WILLIAMS.
CIGARETTE MAKING MACHINE.
No. 589,883.  Patented Sept. 14, 1897.
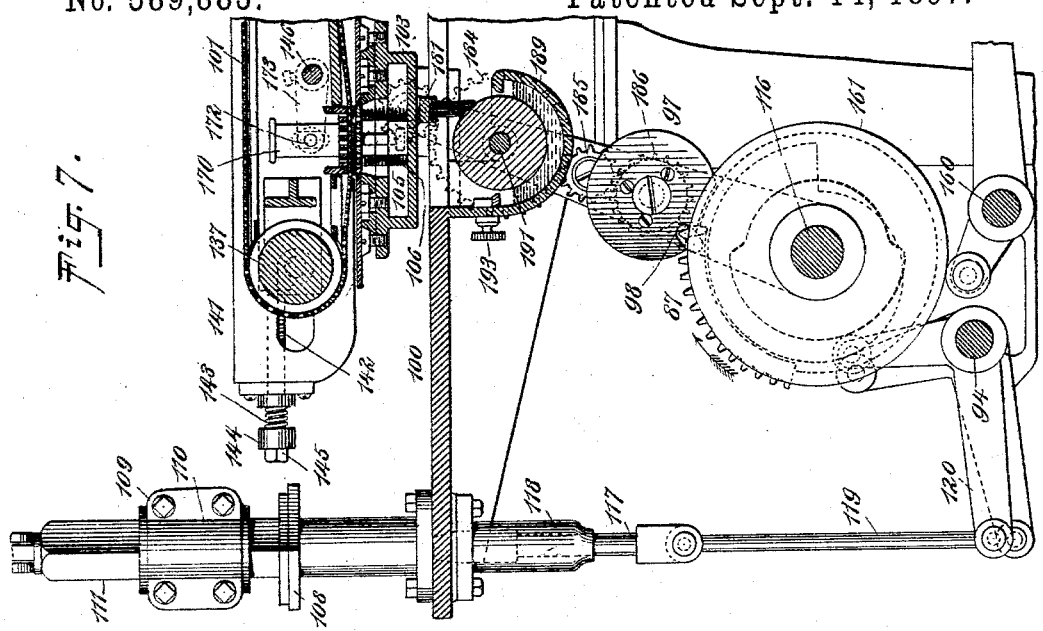
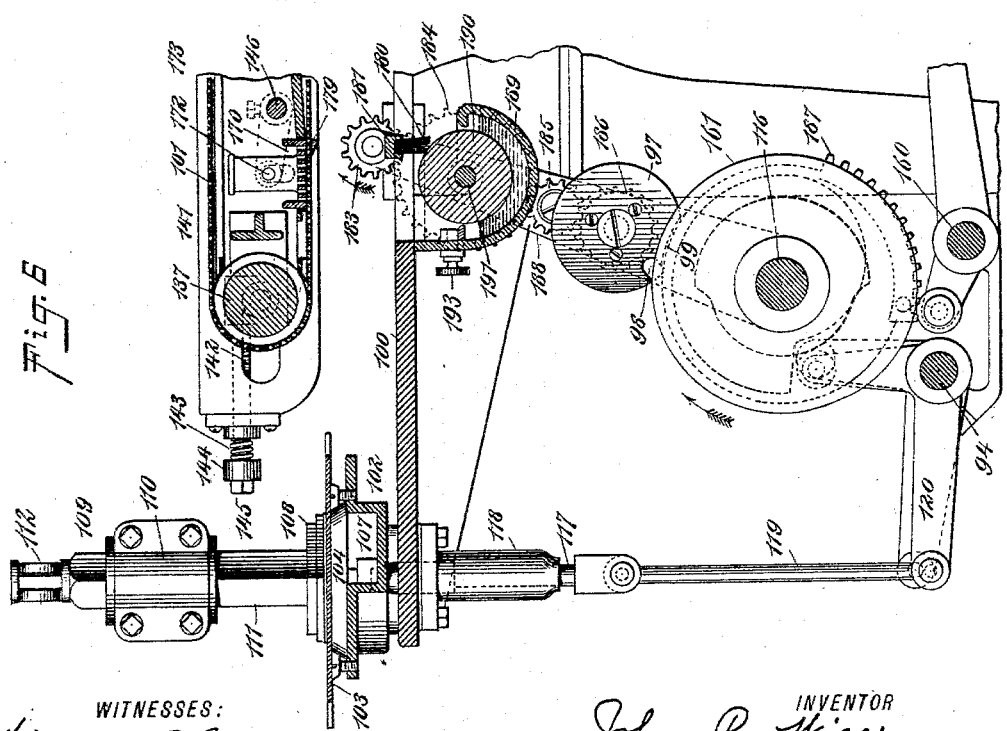
WITNESSES:
William P. Goebel.
Edward D. Miller.
INVENTOR
John R. Williams
BY
Chas. C. Gill
ATTORNEY.

(No Model.) 15 Sheets—Sheet 6.

J. R. WILLIAMS.
CIGARETTE MAKING MACHINE.

No. 589,883. Patented Sept. 14, 1897.

WITNESSES:
William P. Goebel
Edward D. Mills

INVENTOR
John R. Williams
BY
Chas. E. Gill
ATTORNEY.

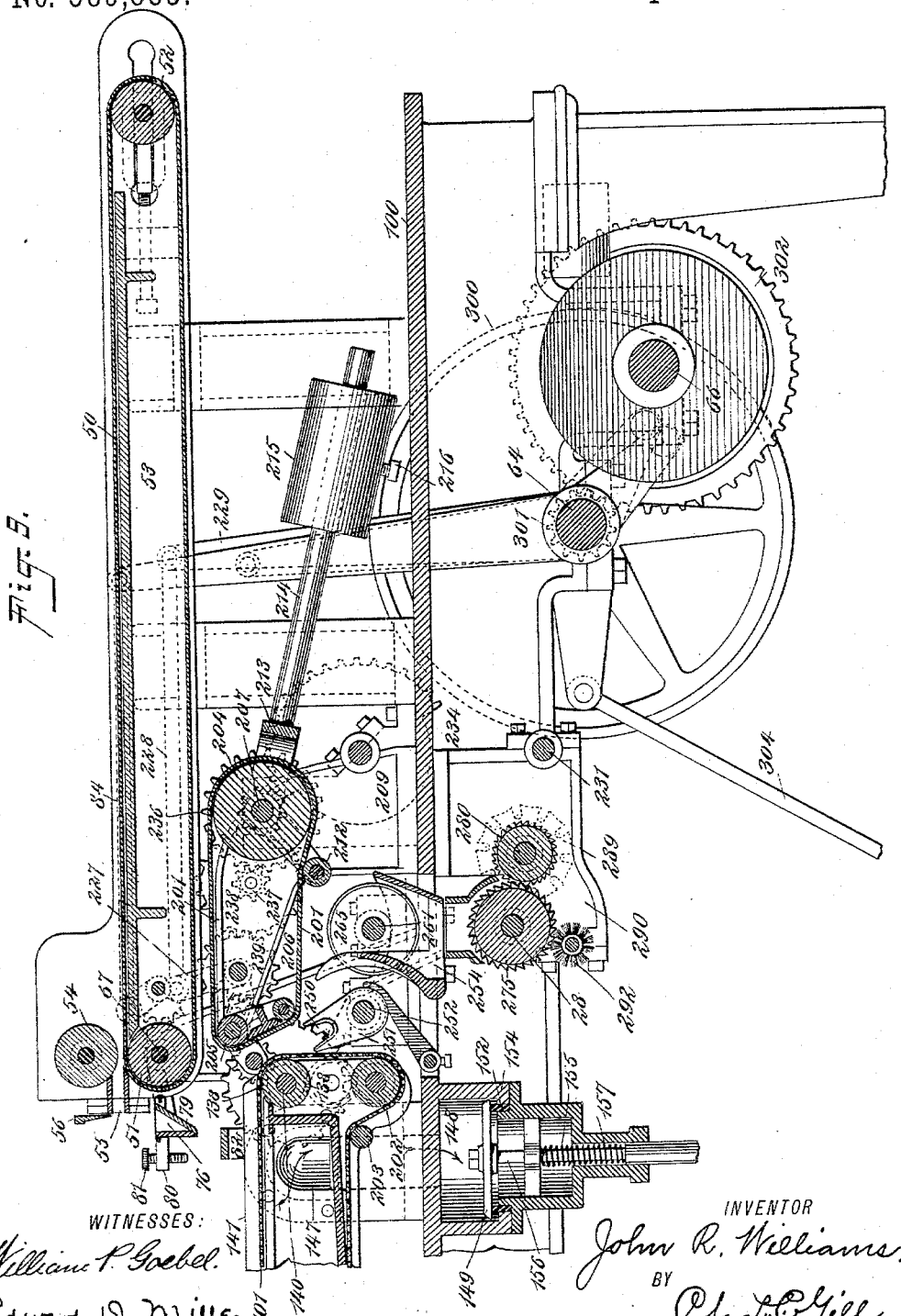

(No Model.) 15 Sheets—Sheet 8.
J. R. WILLIAMS.
CIGARETTE MAKING MACHINE.
No. 589,883. Patented Sept. 14, 1897.
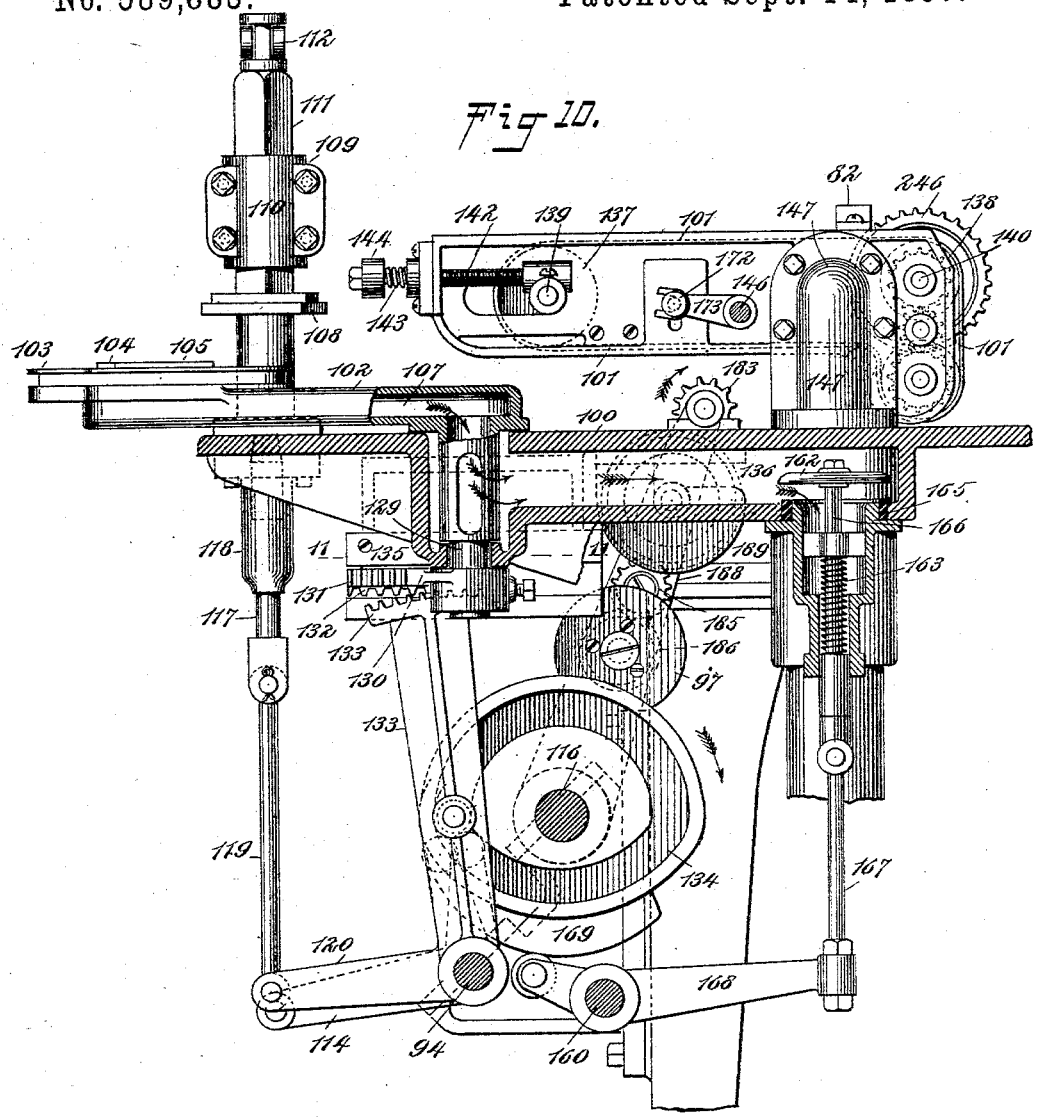
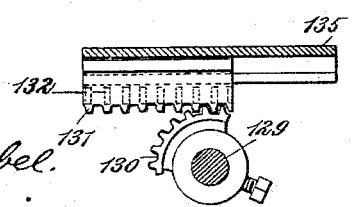
WITNESSES:
William P. Goebel.
Edward D. Miller.
INVENTOR
John R. Williams,
BY Chas. C. Gill
ATTORNEY.

(No Model.) 15 Sheets—Sheet 9.

J. R. WILLIAMS.
CIGARETTE MAKING MACHINE.

No. 589,883. Patented Sept. 14, 1897.

Fig. 12.

WITNESSES:
William P. Goebel.
Edward D. Miller.

INVENTOR
John R. Williams,
BY
Chas. C. Gill
ATTORNEY.

THE NORRIS PETERS CO., PHOTO-LITHO., WASHINGTON, D. C.

(No Model.) 15 Sheets—Sheet 10.
J. R. WILLIAMS.
CIGARETTE MAKING MACHINE.
No. 589,883. Patented Sept. 14, 1897.
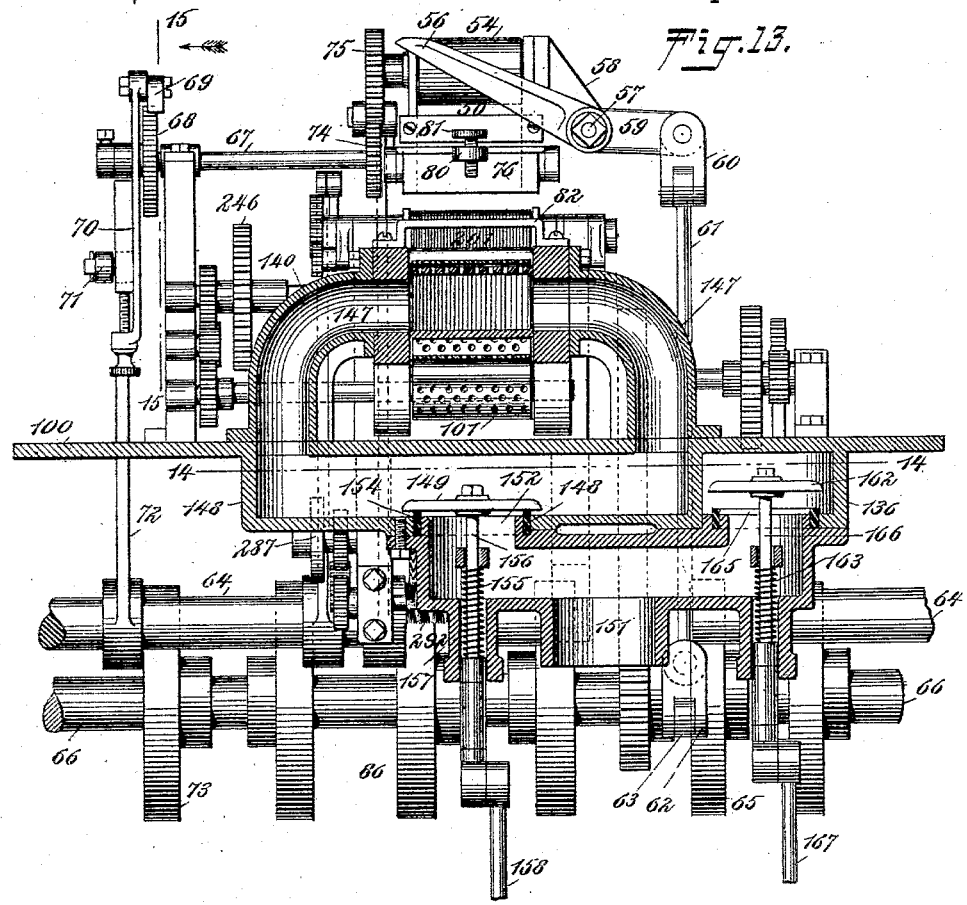
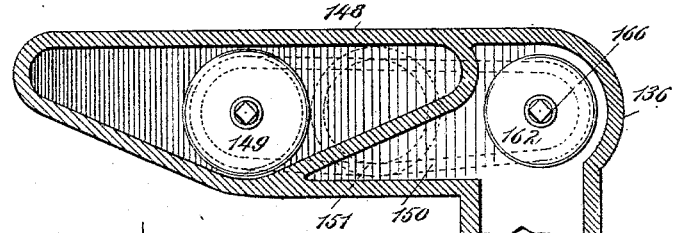
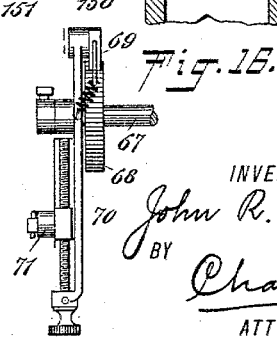
WITNESSES:
William P. Goebel.
Edward D. Miller.
INVENTOR,
John R. Williams,
BY Chas. C. Gill
ATTORNEY.

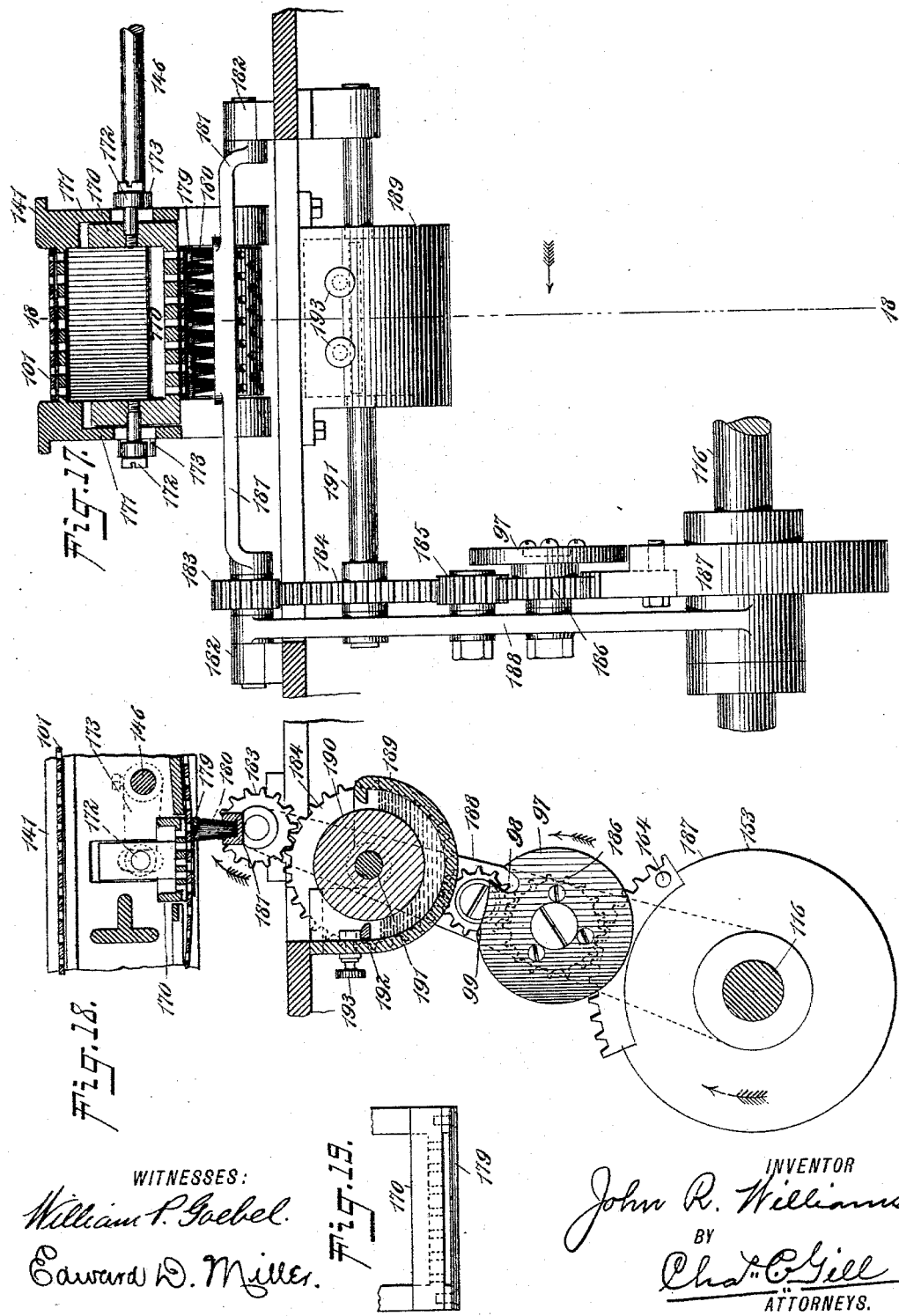

(No Model.)  
15 Sheets—Sheet 12.

J. R. WILLIAMS.
CIGARETTE MAKING MACHINE.

No. 589,883.  
Patented Sept. 14, 1897.

Fig. 20.

WITNESSES:  
William P. Goebel  
Edward D. Miller

INVENTOR  
John R. Williams,  
BY Chas. C. Gill  
ATTORNEY.

(No Model.)

15 Sheets—Sheet 13.

J. R. WILLIAMS.
CIGARETTE MAKING MACHINE.

No. 589,883.

Patented Sept. 14, 1897.

WITNESSES
Wm. P. Goebel.
Edw. D. Miller.

INVENTOR
John R. Williams,
BY
Chas. C. Gill
ATTORNEY.

(No Model.) 15 Sheets—Sheet 14.
J. R. WILLIAMS.
CIGARETTE MAKING MACHINE.
No. 589,883. Patented Sept. 14, 1897.
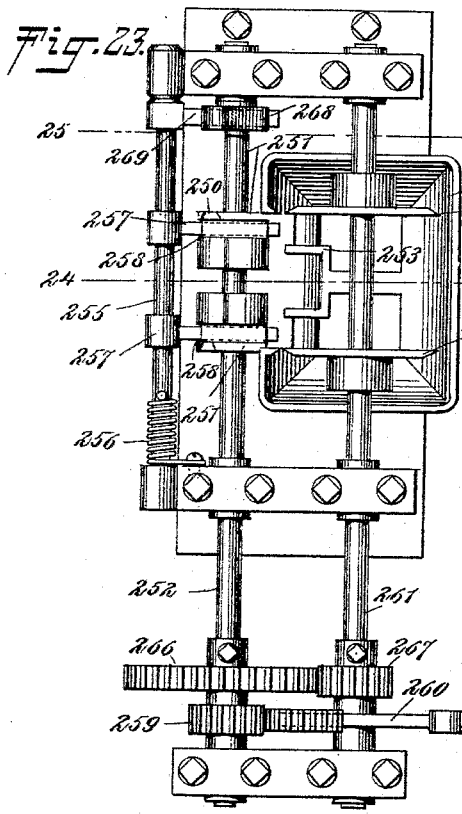
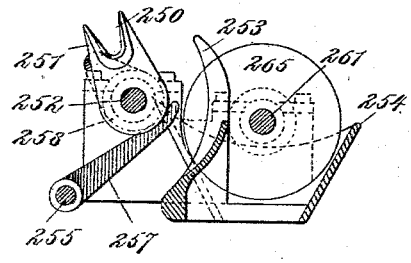
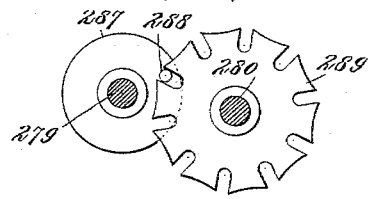
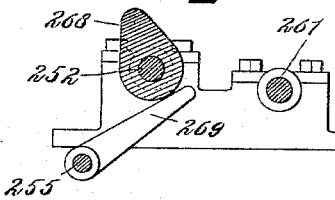
WITNESSES:
William P. Goebel.
Edward D. Miller.
INVENTOR
John R. Williams,
BY
Chas. C. Gill
ATTORNEY.

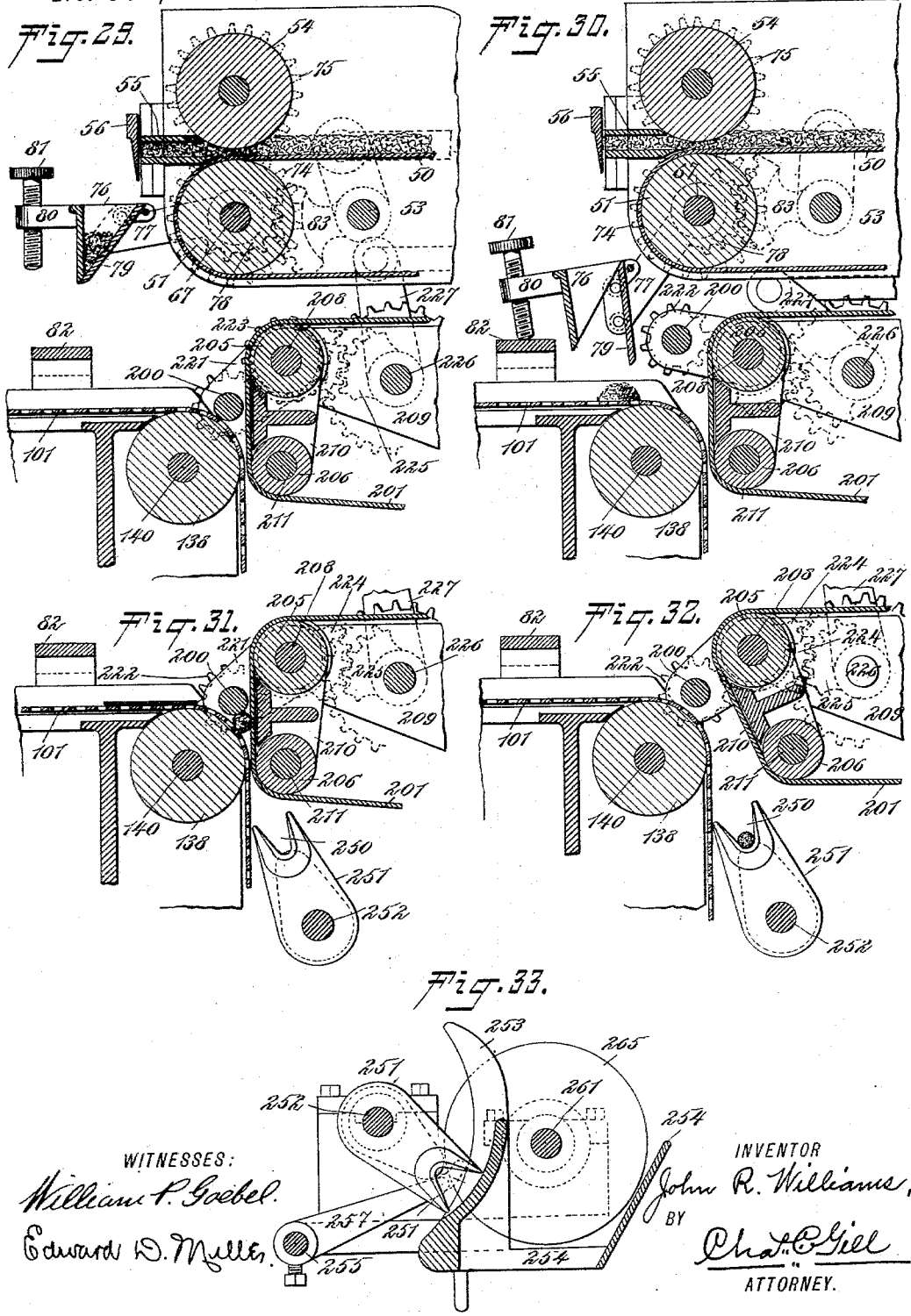

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

CIGARETTE-MAKING MACHINE.

SPECIFICATION forming part of Letters Patent No. 589,883, dated September 14, 1897.

Application filed September 9, 1896. Serial No. 605,280. (No model.)

*To all whom it may concern:*

Be it known that I, JOHN R. WILLIAMS, a citizen of the United States, and a resident of East Orange, in the county of Essex and State of New Jersey, have invented certain new and useful Improvements in Cigarette-Making Machines, of which the following is a specification.

The invention relates to improvements in machines for making cigarettes; and it consists in the novel features and combinations of parts, with certain details of construction hereinafter fully described, and particularly pointed out in the claims.

The machine embodying the invention made the subject of this application embraces automatic mechanism for feeding the filler-tobacco in bulk, severing predetermined charges of the same and delivering said charges to a charge-box which conveys the same to the rolling mechanism, and also novel mechanism for cutting the wrappers for the cigarettes, conveying the same to a transferring or wrapper-carrier belt, applying paste to the edges of the wrappers, and delivering the cut and pasted wrappers while held distended under air-suction to the rolling mechanism. The machine made the subject hereof also embraces novel mechanism for rolling the cigarettes and trimming the ends thereof, and also means for receiving the trimmed ends from the cigarettes and repreparing the same into proper condition for use as filler-tobacco upon the feed-apron of the machine.

The construction and operation of the various parts of the machine will be specifically described in their order hereinafter, from which description and the accompanying drawings the invention will be more fully understood.

The machine which is the subject hereof is illustrated in the operation of rolling all-tobacco cigarettes, but I do not confine the invention in all its parts to the use of a tobacco wrapper or binder, nor to the making of cigarettes of any special length or diameter. Nor is the invention confined to rolling what are technically known in law and commerce as "cigarettes," since the filler and wrapper or binder may be of larger proportions than those required for the usual cigarettes, and under such circumstances the product will be ordinarily termed "cigars," or bear other trade designations.

In the drawings are shown various cams, gears, and connecting-arms for imparting movement from the main driving-shaft to the mechanism constituting the essential parts of the machine; but the invention is not confined to these special cams, gears, and arms, and they may be varied at will within the scope of the intelligent mechanic.

Figure 2:
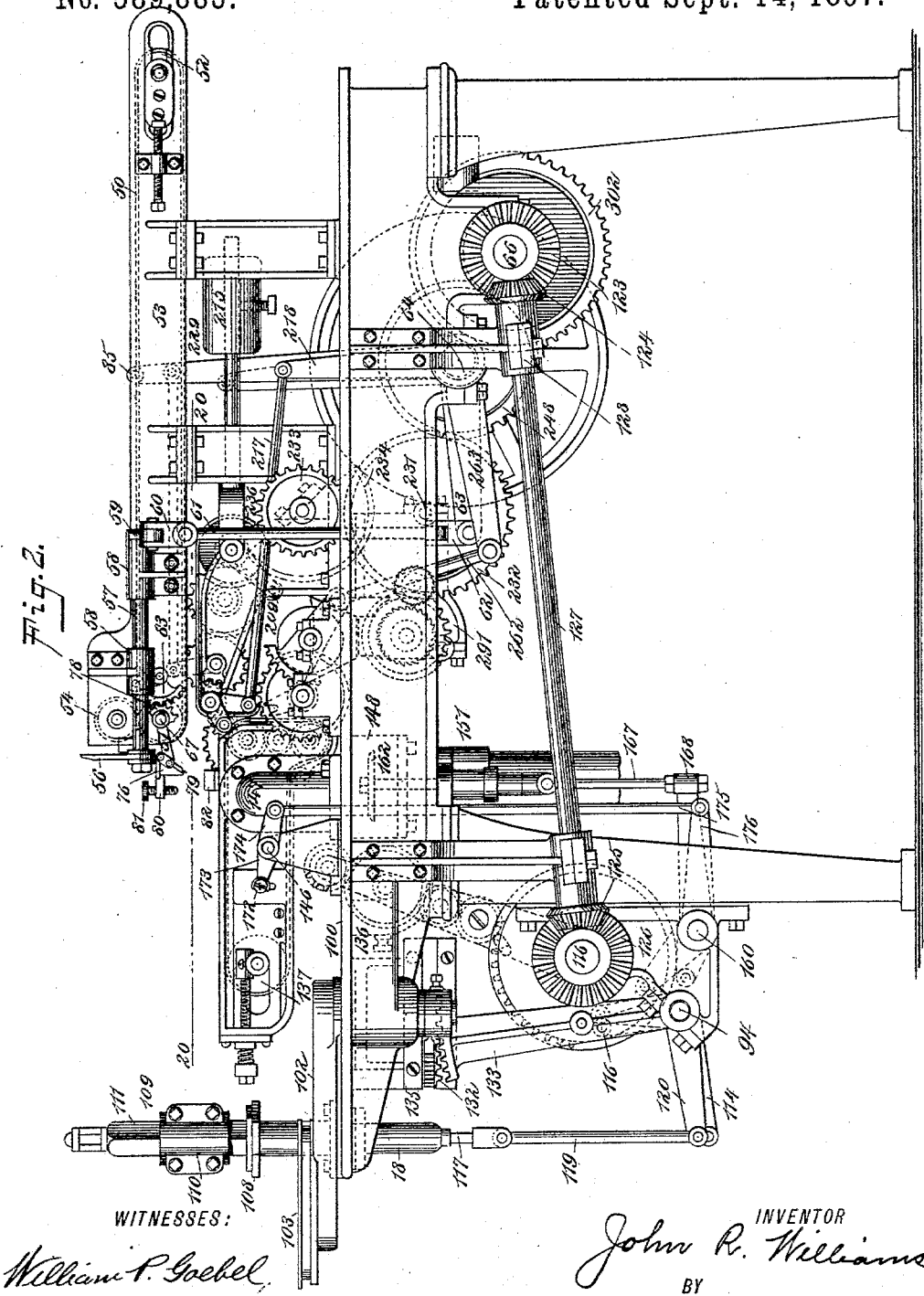
Figure 3:
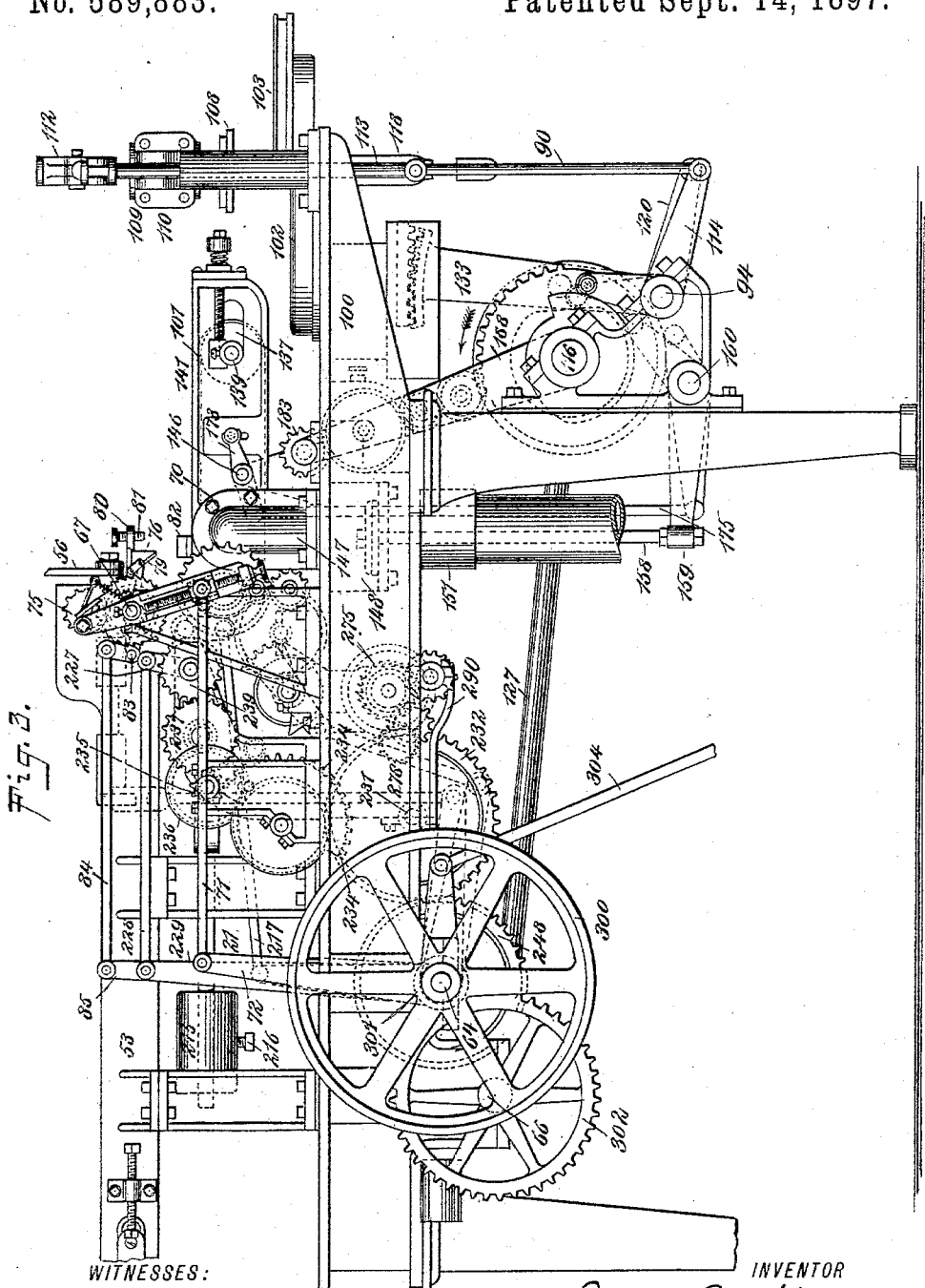
Figure 4:
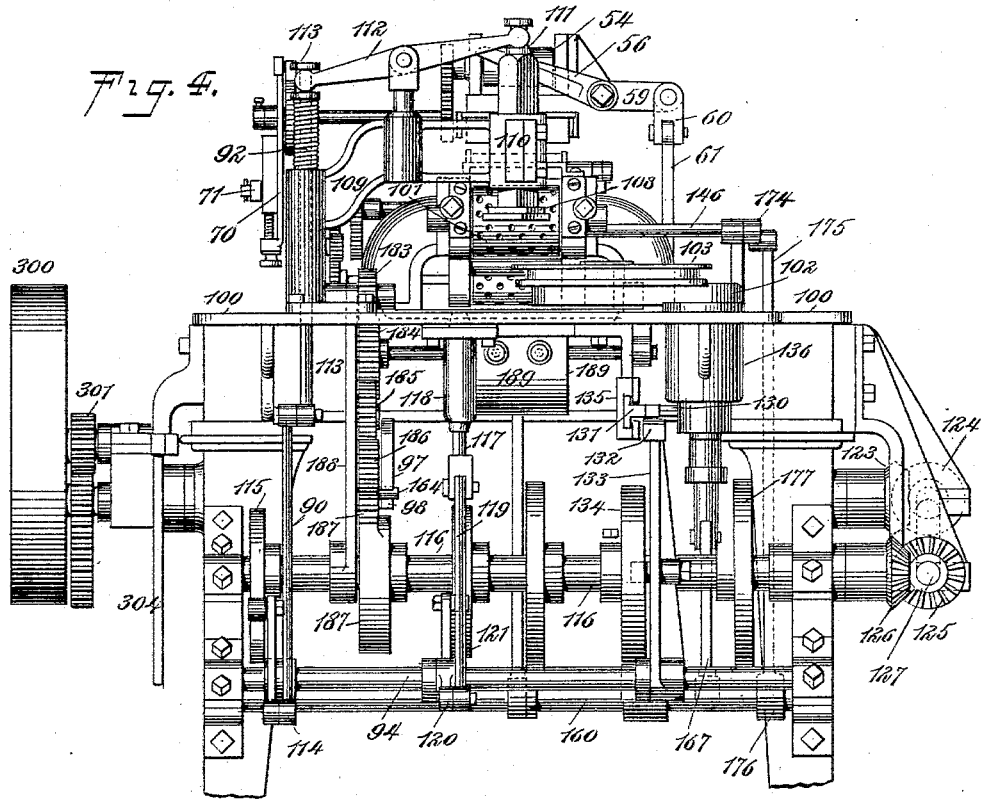
Figure 5:
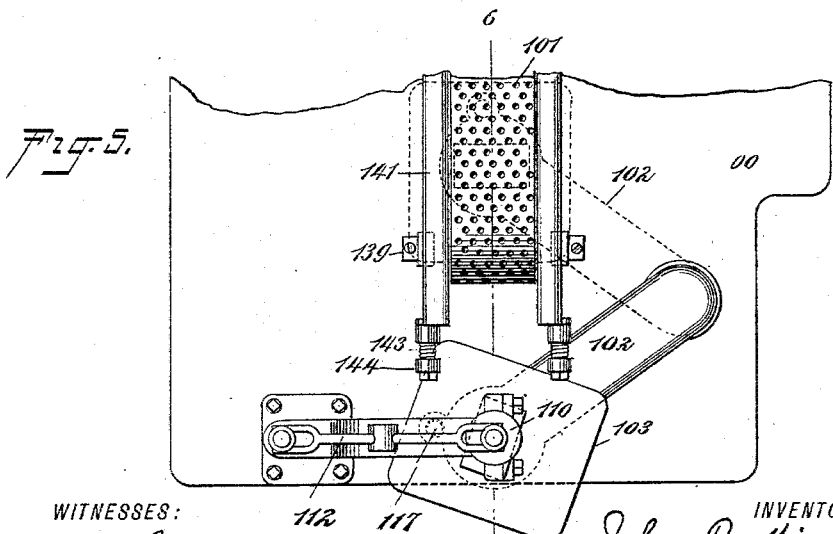
Figure 8:
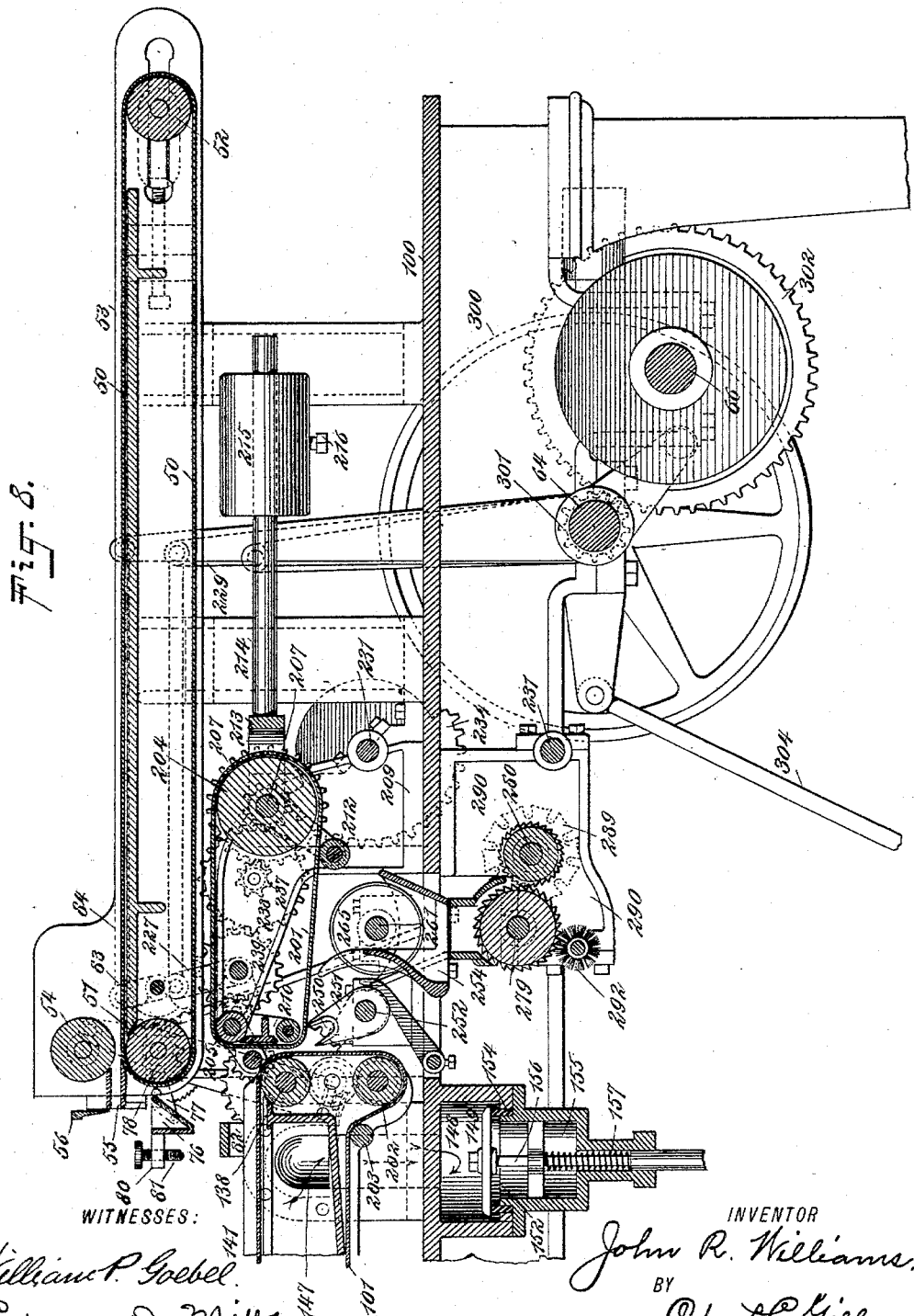
Figure 21:
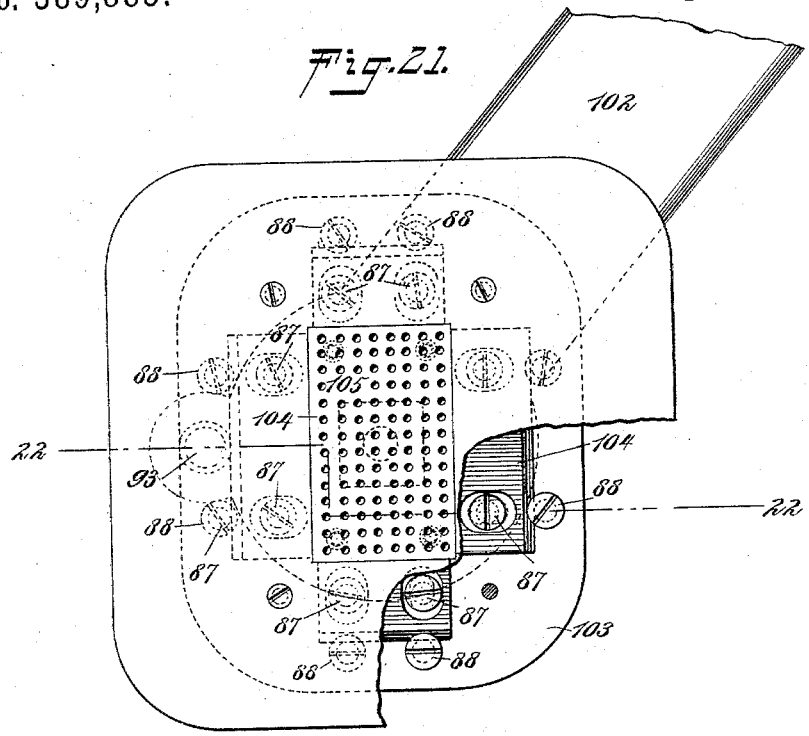
Figure 22:
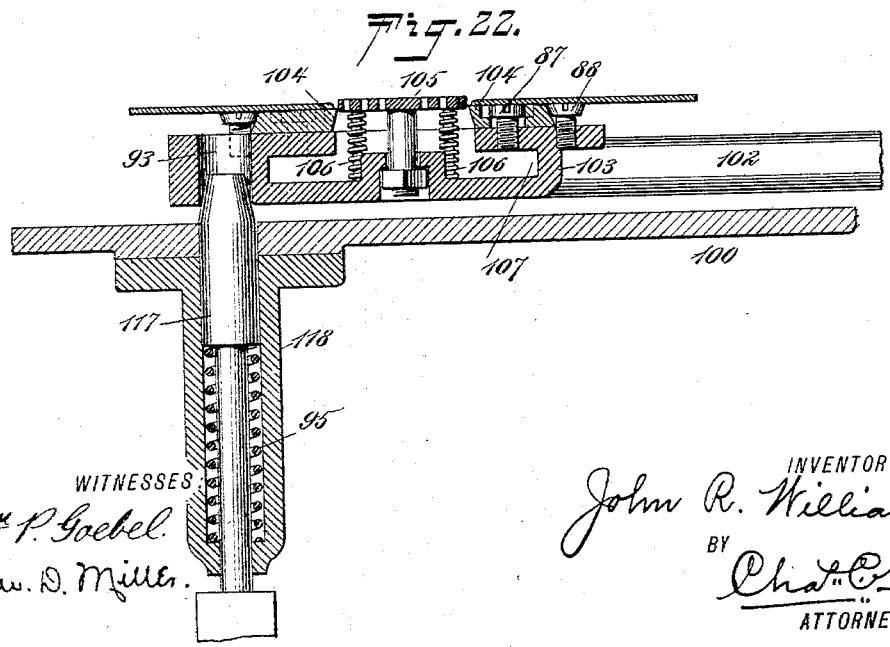

Referring to the accompanying drawings, Figure 1 is a top view of a machine constructed in accordance with and embodying the invention. Fig. 2 is a side elevation of same and shows the right-hand side of the machine. Fig. 3 is a like elevation of the left-hand side of the machine. Fig. 4 is a front elevation of the machine. Fig. 5 is a detached top view of the front portion of the machine, showing the wrapper-cutting die beneath the punch by full lines and the position of said die when below the perforated wrapper-carrying belt by dotted lines. Fig. 6 is an enlarged vertical section through the front portion of the machine on the dotted lines 6 6 of Fig. 5, this figure also showing the die below the punch and the latter in its depressed position. Fig. 7 is a like section of same on said dotted line 6 6 of Fig. 5 and shows the wrapper-cutting die in position below the perforated wrapper-carrier belt and the latter in the act of removing the cut wrapper from said die. Fig. 8 is a vertical longitudinal section of a part of the machine on the dotted line 8 8 of Fig. 1. This figure is practically a continuation of Figs. 6 and 7. Fig. 9 is a similar section to Fig. 8, but showing the rolling-belt in the position it assumes when the rolled cigarette is to be released and permitted to pass to the trimming mechanism. Fig. 10 is an enlarged vertical section of the machine on the dotted line 10 10 of Fig. 1. Fig. 11 is a detailed section of a part of the machine on the line 11 11 of Fig. 10. Fig. 12 is an enlarged vertical section through the main portion of the machine on the dotted line 12 12 of Fig. 1. Fig. 13 is an enlarged transverse section of the machine on the dotted line 13 13 of Fig. 1. Fig. 14 is a horizontal section through a portion of the machine on the dotted line 14 14 of Fig. 13. Fig. 15 is a vertical section through a portion of the machine on the dotted line 15 15 of Fig. 13 and shows the ratchet mechanism and the regulating or adjusting mechanism for the feed of the filler-tobacco. Fig. 16 is an edge view of same. Fig. 17 is an enlarged transverse section of the machine on the dotted line 17 17 of Fig. 20 and illustrates the application of the line of paste to the edge of the wrapper held by the perforated wrapper-carrying belt. Fig. 18 is a vertical section of same on the dotted line 18 18 of Fig. 17. Fig. 19 is a detached front view of the lower portion of the plunger located within the outlines of the perforated wrapper-carrying belt and having an inclined strip or edge against which the edge of the cigarette-wrapper rests while having the paste applied thereto. Fig. 20 is in part a sectional view looking downward on the dotted line 20 20 of Fig. 2 and in part broken away to disclose the mechanism confined within the outlines of the perforated wrapper-carrier belt. Fig. 21 is an enlarged top view, partly broken away, of the wrapper-cutting die and its carrying-arm. Fig. 22 is a sectional view of same on the dotted line 22 22 of Fig. 21. Fig. 23 is a detached top view of the mechanism for trimming the ends of the rolled cigarettes. Fig. 24 is a detached sectional view of same on the dotted line 24 24 of Fig. 23. Fig. 25 is a like section of same on the dotted line 25 25 of Fig. 23. Fig. 26 is a detached top view of the braking-rolls for treating the trimmings from the ends of the rolled cigarettes. Fig. 27 is a vertical section of same on the dotted line 27 27 of Fig. 26. Fig. 28 is a like section of same on the dotted line 28 28 of Fig. 26. Fig. 29 is an enlarged detached vertical section corresponding with the left-hand portion of Fig. 9 and showing the knife for severing the charges of tobacco in its lower position and a charge of tobacco in the charge-box ready to be moved downward therein to the cigarette-rolling mechanism. Fig. 30 is a like view of same, showing the charge-box in its lower open position and the severed charge of tobacco as having been delivered to the rolling mechanism. Fig. 31 is a like section of a portion of same, showing particularly the rolling mechanism in the operation of rolling the severed charge of tobacco preparatory to receiving the wrapper, which is illustrated as being carried thereto by the perforated wrapper-carrier belt. Fig. 32 is a like section of same, showing the rolling-belt in its receded position, releasing the rolled cigarette and permitting its descent to the trimming mechanism; and Fig. 33 is a vertical section of the mechanism for trimming the ends of the cigarette and corresponds with Fig. 24, but illustrates the parts in a different position.

*Tobacco-feeding mechanism.*—The filler-tobacco is fed inward upon an endless traveling belt 50, mounted upon rollers 51 52 between the sides 53 53, which, with said belt 50, constitute the feed-trough, as shown in Figs. 1, 2, 8, 9, 29, and 30. The filler-tobacco will be spread as evenly as may be upon said belt 50 and will by the latter be carried inward to the operative parts of the machine. At the inner end of the belt 50 there is mounted directly over the roller 51 the roller 54, below which the filler-tobacco passes and which acts as a pressure-roller thereon. At the front end of the traveling feed-belt 50 is formed the throat 55, and directly in front of this throat, through which the filler-tobacco passes, is mounted the knife 56, by means of which the separate charges of filler-tobacco are cut from the main body of the tobacco fed inward upon the belt 50. The knife 56 is mounted upon the front end of the rock-shaft 57, Figs. 2 and 12, which is suitably supported in bearings 58 and is connected by the arm 59 and knuckle 60 with the rod 61, which extends downward, and by means of the knuckle 62 is connected with the arm 63, mounted upon the shaft 64 and having its extreme rear end in contact with the cam 65, located on the shaft 66. The knife 56 has a draw-cut and receives its motion from the rocking or oscillation of the shaft 57, which is actuated from the shaft 66 through the connections just referred to and numbered 59, 60, 61, 62, 63, and 65. The belt 50 has an intermittent feed-motion, and its motion is timed with the operation of the knife 56 in order that the charges of tobacco severed by the said knife may be uniform and regular. The belt 50 also receives its motion from the shaft 66, and the front roller 51 of said belt is mounted upon a shaft 67, Figs. 1, 3, 13, 15, and 16, carrying a ratchet-wheel 68, and this ratchet-wheel is engaged by the pawl 69, which has a spring-tension toward said ratchet and is carried by the arm 70, which is actuated from the main shaft 66 through the connecting-rod 71, arm 72, and cam 73, the latter being directly mounted upon the said shaft 66 and engaging a stud carried by said arm 72. The revolving motion of the shaft 66 and cam 73 imparts a reciprocating motion to the rod 71, and this motion is transferred to the pawl 69, which, when moving against the teeth of the ratchet 68, will revolve the latter and through it the shaft 67 and roller 51. During the reverse motion of the pawl 69 its point will slide over the teeth of the ratchet 68, and at such time the shaft 67, roller 51, and belt 50 will be at rest. The motion of the roller 51 is communicated to the upper or pressure roller 54 by means of the usual gear-wheels 74 75, connected with said rollers and engaging one another, as illustrated in Figs. 1, 2, 13, 29, and 30.

In the above description the means for feeding the filler-tobacco intermittently and severing the separate charges thereof for cigarettes has been explained.

The separate charges of filler-tobacco severed by the knife 56 are conveyed to the rolling mechanism by means of the charge-box 76, Figs. 2, 8, 9, 29, and 30, which is substantially triangular in vertical cross-section and is carried by the arms 77, which are mounted upon the shaft 67 and one of which is provided with a toothed segment 78. The box 76 is secured in a hinged manner to said arms 77, while the bottom 79 of said box is rigid with said arms 77, Figs. 29 and 30, and hence when said box is carried downward by the oscillating motion of the arms 77 the box proper opens outward from the bottom 79 in order to permit of the escape of the charge of tobacco carried by the box. The box 76 has rigidly secured to it the arm 80, carrying the set-screw 81, the latter acting as an adjustable stop and being adapted upon the lowering of the box 76 to come into contact with the rigid bridge 82 and arrest the motion of the box 76, while the bottom 79 thereof continues on its downward motion with the arms 77. During the downward movement of the box 76 the contact of the stop 81 with the bridge 82 results in the box proper separating at its lower edge from the bottom 79, thus opening the box and permitting the charge of tobacco carried downward thereby to escape to the rolling mechanism. The box 76 receives its downward and upward motion directly from the oscillating segment 83, which engages with the toothed segment 78, formed on one of the arms 77, which carry the said box 76. The segment 83 receives its motion from the main driving-shaft 66 through the rod 84, arm 85, and cam 86, Fig. 3, the latter being directly upon the said shaft 66 and acting upon a stud carried by the said arm 85.

*Wrapper-cutting mechanism.*—At the front portion of the main table 100 of the machine is provided mechanism for cutting the wrappers and delivering them one after another, while held distended by air-suction, to the delivery or transferring belt or apron 101, by which they are carried to the rolling mechanism. Upon the front portion of the table 100 is mounted the oscillatory arm 102, Figs. 1, 5, 10, 21, and 22, carrying upon its outer end the table 103, which supports the cutting-die 104, having within its outline the perforated platen 105, which is connected with the air-suction apparatus in the manner hereinafter described. The platen 105 is supported upon springs 106, Fig. 22, and is of the outline desired for the cigarrette-wrapper. The oscillating arm 102, carrying the table 103, is hollow and forms the air-chamber 107, Fig. 10, which opens into the said die 104. The table 103, carrying the die 104, is illustrated in its outward position in Figs. 1 and 10, and said table has a mechanism which first carries it below the punch 108, as shown in Fig. 6, and then below the transferring belt or apron 101, as shown in Fig. 7, from which latter position the said table has an outward movement to the position shown in Figs. 1 and 10, not stopping at the punch 108 during its outward movement. The table 103 is of suitable size to receive the leaf from which the wrapper is to be cut, its upper portion being a flat plate, as shown in Figs. 21 and 22, secured in place by screws and having a rectangular opening at its center to receive the platen 105.

The sides and ends of the die 104 are each in a separate piece separately secured by the screws 87 and 88, Figs. 21 and 22, the latter having the inclined sides of its head against the inclined outer edge of the die-section and being adapted when screwed downward to wedge against said die-section and move it inward. The screws 87 are clamping-screws and pass through slots in the die-sections. When the screws 87 are loosened, the screws 88 may be used to adjust said sections to compensate for wear or other purpose. The screws 88 also brace the die-sections against any unintended outward movement. In suitable position upon the front portion of the table 100 is mounted the frame 109, Figs. 1, 4, 6, 7, and 10, at the right-hand end of which is provided the bearing 110, in which the punch-rod 111 is adapted to have a vertical movement. The punch 108 is carried at the lower end of said rod 111. The upper end of the rod 111 is engaged by the pivotally-mounted arm 112, Fig. 4, whose left-hand end is connected with the vertical rod 113, which extends downward through the bed of the machine and is connected with the rod 90 and arm 114, by which it is operated through the medium of the cam 115, mounted upon the shaft 116, extending transversely across the front portion of the machine and at a suitable distance below the bed 100 of the same. The punch 108 has simply a vertical reciprocation and its outline corresponds with the die 104, with which it coöperates to cut the wrapper from the leaf held upon said die by air-suction. The punch 108 is elevated by the cam 115, acting through the arm 114, rod 90, rod 113, and lever 112, and receives its downward movement to cut the wrapper by means of the coiled spring 92, interposed on the rod 113 between the frame 109 and left-hand end of the lever 112, as shown in Fig. 4. The form of the cam 115 is such that the arm 114 is at the proper time permitted freedom of movement under the action of the spring 92, and at such time the spring operates to quickly drive the punch 108 downward into the die, then below it, for the purpose of cutting out the wrapper from the leaf spread over the platen 105.

In order that the die 104 may be firmly retained below and in alinement with the punch 108 on its inward movement to that point preparatory to the cutting of the wrapper, the stop-pin 117 has been provided to engage an aperture or recess 93, Fig. 22, in the lower surface of the table 103. The stop-pin 117 has a vertical reciprocation within its casing 118, which extends below the bed-plate 100 of the machine, and said pin is connected with the rod 119, whose lower end is pivotally secured to the arm 120, which is pivotally mounted upon the shaft 94 and receives its motion from the cam 121, secured upon the shaft 116. The timing of the cam 121 is such that the locking-pin 117 will be released thereby to ascend to engage the table 103 under the action of the spring 95, Fig. 22, only at such time as the table 103 is in proper position below the punch 108. The pin 117 insures the proper position of the die 104 during the time the punch is to operate for the purpose of cutting a wrapper, and thereafter said pin 117 is moved downward out of the way by the cam 121 in order that the table 103 may continue its inward movement, as shown by dotted lines in Fig. 5, to carry the die 104 and the cut wrapper thereon directly below the proper portion of the perforated traveling belt 101, as shown in Fig. 7.

The shaft 116 receives its motion, which is imparted to the cam 121, as well as the other cams on said shaft, from the main driving-shaft 66 through the medium of the intermediate beveled gear-wheels 123, 124, 125, and 126, Fig. 2, and the intermediate shaft 127, which is suitably supported in bearings 128. The motion of the shaft 116 is also utilized to effect the oscillating movement of the arm 102, which arm has a downwardly-extending section at its pivoted end, and upon this section, numbered 129, Figs. 10 and 11, is formed the segment 130, which is engaged by the longitudinally-reciprocating rack 131, which rack is provided upon its lower edge with the teeth 132 in engagement with the toothed segment 133, the latter being pivotally mounted upon the shaft 94 and having a stud engaged by the cam 134, the latter being driven from the shaft 116 and causing said segment 133 to have an oscillating movement from the shaft 94. The oscillating motion of the segment 133 causes the rack 131 to slide longitudinally in the guide 135 and to effect the oscillation of the arm 102 through its engagement with the segment 130, carried by said arm. Below the table 100 and in communication with the arm 102 is formed the air-chamber 136, from which, as hereinafter described, the air is turned on or cut off by suitable mechanism timed with the air-valves provided for the transferring-belt 101, and the air mechanism for the said arm 102 will be hereinafter fully set forth. At present it need only be said that the air, by means of any suitable suction-blower, is caused to act on and through the said arm 102 at all times when the wrapper is on the die 104 for the purpose of there retaining the wrapper, except at the moment the said die is at its proper position below the transferring-belt 101 and is about to deliver the wrapper to said belt. At the moment the die 104 is to deliver the wrapper to the belt 101 the air-suction is cut off from the arm 102 in order that the wrapper may be released from the die 104 and immediately, while in its distended condition, taken up by said belt 101, which will be porous or perforated and also connected with air-suction and deliver the wrapper in its distended condition to the rolling mechanism, hereinafter described.

*Wrapper-transferring mechanism.*—It has been described above that the cut wrapper is taken from the die 104 by means of the transferring-belt 101, by which it is delivered to the rolling mechanism. The transferring-belt 101 is perforated throughout and is mounted upon the front roller 137, Fig. 20, and inner roller 138, Fig. 9, which rollers are respectively mounted upon the shafts 139 and 140, mounted in the frame 141, which is supported above the bed-plate 100 of the machine and provided with the adjusting-screws 142, Fig. 20, connected with said shaft 139 for adjusting the position of the latter and providing the proper tension for the transferring-belt 101. The adjusting-screws 142 extend frontward through the front end of the frame 141 and receive upon their outer ends the coiled springs 143, caps 144, and securing-nuts 145. The said shaft 139 may be adjusted by the screws 142, but will, nevertheless, be enabled to yield inward, owing to the interposition of the springs 143 between the nuts 145 and frame 141. The inward yielding of the shaft 139 becomes of importance during the operation of permitting said belt 101 to remove the cut wrapper from the die 104, since at such times, by means of the plunger hereinafter described, the lower part of the said belt 101 is depressed upon the said die in order to lift the wrapper therefrom and maintain it in its distended condition. When the lower part of the belt or apron 101 is thus depressed upon the die 104, the shaft 139 will be thereby pulled inward slightly in order to prevent undue strain coming upon the said apron or belt 101. As soon as the force depressing the lower part of the belt or apron 101 downward in contact with the die 104 is relieved the springs 143 will drive the shaft 139 outward to its former position and thus restore the normal position of the belt 101. At the inner end of the frame 141 its interior chamber is in communication with the vertical frames or elbow-pipes 147, Figs. 13 and 20, which extend downward to the bed-plate 100, and are in communication with the air box or chamber 148, which contains the valve 149, and is connected with the air-suction through the chamber 150 and main air-pipe 151. In the base of the air box or chamber 148 is formed an opening to receive the flange 152, formed on the air-box 148, which flange is provided with the vertical groove containing the vertically-arranged packing 154, upon which the valve 149 is adapted to seat itself under the tension of the spring 155. The valve 149 is a disk mounted upon the rod 156, which extends downward through a suitable sleeve 157, and is connected with the rod 158, whose lower end is secured to the arm 159, which is mounted upon the shaft 160, and is acted upon by the cam 161, mounted upon the shaft 116, which, through said cam, operates to elevate the valve 149 from its seat during such time only as it is desired to have the air drawn downward through the traveling belt 101, air box or chamber 148, and the chamber 150. Upon the cam 161 releasing its force upon the arm 159 the spring 155 will reseat the valve 149 and cut off the air-suction from the chamber 148 and also from the belt 101, which is in direct communication with said chamber.

The chamber 148 and valve 149 are intended exclusively for use in connection with the traveling belt 101, and said parts have no relation to the die 104, which, while subjected to the air-suction through the main air-pipe 151, is furnished with an independent valve 162, which is similar in construction to the valve 149 and seats itself automatically by means of the spring 163, Fig. 13, which exerts a downward pull upon the said valve 162. The box or chamber 150 contains for the valve 162 the vertical annular packing 165, receiving the outer edges of the disk valve 162. The stem 166 for the valve 162 receives its motion from the rod 167, which is connected with the arm 168, the latter receiving its motion from the shaft 116 by means of the cam 169, which engages said arm and operates to elevate the valve 162 for the purpose of connecting the oscillating arm 102 and die 104 with the main air-pipe 151. The valve 162 remains elevated during all of the time it is desired that the air shall hold the leaf or wrapper upon the die 104, and at the moment the transferring-belt 101 is depressed upon the die 104 to lift the wrapper therefrom the cam 169 permits the descent of the valve 162 upon its seat, thereby cutting off the air from the said die and permitting the air then acting through the said belt 101 to quickly cause the wrapper while in its distended condition to adhere to the said belt 101 preparatory to its being carried thereby to the rolling mechanism. The roller 137 for the belt 101 is grooved in order to form air-passages around it, and the belt or apron 101 is porous or perforated throughout in order that the air-suction may take the wrapper from the die 104 and maintain its hold upon the same while the said belt is traveling over the roller 137 and until the wrapper is delivered to the rolling mechanism. The opposite sides of the frame 141 are closed between the rollers 137 and 138 and form an air-chamber, and within this air-chamber is arranged the plunger 170, which at its ends is mounted in guides 171, which are at opposite sides of the said frame 141 and are provided with the screws 172, which extend outward through slots formed in the sides of the frame 141 and are engaged by the forked front ends of the pivoted levers 173, mounted on the shaft 146, provided with the rearwardly-extending arm 174, to which is pivotally connected the downwardly-extending rod 175, the latter at its lower end being connected to the arm 176, Fig. 2, mounted upon the shaft 160 and engaged by the cam 177, secured upon the shaft 116. The cam 177 acts through the arm 176, rod 175, arm 174, shaft 146, levers 173, and screws 172 to reciprocate the plunger 170 in its guides 171. The timing of the machine is such that the plunger 170 is depressed against the lower section of the endless belt or apron 101 only when the die 104 is directly below said plunger and belt and the latter is ready to receive the wrapper from said die. The depression of the plunger 170 is simply for the purpose of enabling the lower section of the belt 101 to come into firm contact with the upper surface of the die 104 and lift the wrapper therefrom. After the belt 101 has taken the wrapper from the die 104 the plunger 170 immediately ascends to its normal position.

The plunger 170 will be slotted or grooved or in any suitable way be open to permit the air to pass through it in order not to exclude the effect of the air within the belt-chamber from the belt at the point at which said plunger contacts with the latter, as shown in Fig. 7, when depressing the same upon the die 104, and, as above described, when the said plunger 170 is depressed the springs 143 will yield sufficiently to prevent the said plunger from creating undue strain upon the belt. When the plunger ascends from the belt, the tension of the springs 143 will restore the belt to its normal condition. The purpose of the belt 101 is to receive the wrapper in its distended condition from the die 104 and also preserve it distended until it is delivered by the belt to the rolling mechanism, presently to be described.

*Pasting mechanism.*—The paste for securing the wrapper is applied to one edge of the latter while the same is held by the belt 101 and immediately after said belt has taken the wrapper from the die 104. Upon the lower portion of the plunger 170 and extending below one edge of the same just in line with the position of one edge of the die 104 when the latter is at its inward position below the belt 101 is secured the bridge 179, Figs. 6, 7, 17, 18, and 19, which is simply a plain strip having a surface which inclines downward and inward, as shown, and when the wrapper is taken by the belt 101 from the die 104 one of its edges will rest against this bridge 179 and while there will have applied to it by means of the brush 180 a line of paste. The brush 180 is mounted upon the frame 181, whose ends are sustained in bearings 182 and are given an intermittent revoluble motion by means of the chain of gearing 183, 184, 185, 186, and 187, all except the latter of which are carried by the arm 188, which is held at its lower end upon the shaft 116. The frame 181 is given the special form shown for the purpose of swinging entirely out of the way when the brush 180 is pointing downward, as indicated in Fig. 7, and hence the peculiar form of the frame 181 is not to be regarded as a limiting feature. Below the brush 180 and frame 181 is mounted the paste-receptacle 189, containing the roller 190, which has a revoluble motion and against the surface of which the outer end of the brush 180 moves for the purpose of obtaining the requisite amount of the paste to apply to the edge of the wrapper resting against the bridge 179. The roller 190 receives its motion from the gear-wheel 184, which is mounted upon the shaft 191 of said roller. Within the receptacle 189 is provided the scraper 192, Fig. 18, which is adapted to be adjusted toward and from the roller 190 by means of the set-screw 193, and the purpose of said scraper is to prevent any surplus quantity of paste ascending upon the said roller 190. As soon as the belt or apron 101 takes the wrapper from the die 104 and the latter moves outward the brush 180 will immediately ascend and wipe the edge of the wrapper resting against the bridge 179, leaving an edge of paste upon said wrapper, and thereupon the brush 180 will continue its revolution to its downward position and the belt 101 will travel inward in order to deliver the wrapper then cut and pasted to the rolling mechanism. The mechanism for intermittently actuating the belt 101 will be described hereinafter in connection with the mechanism for operating the rolling mechanism.

The brush 180 has an intermittent revoluble motion and the belt 101 has an intermittent traveling motion, as may be readily understood, and its motion and the motion of the brush 180 are timed with respect to one another. The brush 180 derives its motion from the shaft 116 through the intermediate gears 183, 184, 185, 186, and 187, the latter being a segment merely and forming the direct means for setting in motion said chain of gearing. Upon the face of the gear-wheel 186 is secured the locking wheel or disk 97, having the recess 98 and curved section 99, Fig. 18. When the gear 187 is in engagement with the gear 186, the wheel 97 will revolve freely; but when the gear 187 leaves the gear 186 the section 99 of the wheel 97 will pass upon the greater periphery 153 of the gear-wheel 187 and serve to prevent any motion in the gear-wheel 186 until the teeth of the gear 187 again reach the said gear 186, at which time the pin 164, Fig. 18, will engage the recess 98 in wheel 97 and start the latter to revolve.

The invention is not, of course, limited to the special gearing shown for operating the brush 180.

*Tobacco-rolling mechanism.*—It has been described above that separate charges of filler-tobacco are severed by the knife 56 and carried downward to the rolling mechanism by means of the oscillating box 76, and it has also been described above that the wrappers for the cigarettes are cut by the punch 108 and die 104 and conveyed to the rolling mechanism by the transferring-belt 101. The rolling mechanism consists of the roller 200, the belt 201, and the inner end of the belt 101. At its inner end the belt 101 passes over the roller 138, mounted on the shaft 140, and from said roller 138 the belt 101 extends downwardly around the roller 202, Figs. 8 and 9, and thence upward over the small roller 203, whence it passes directly to the front roller 137 for the said belt. The cigarette is rolled below the roller 200 and between the converging facing-surfaces of the belts 101 and 201. The belt 201 passes over the rollers 204, 205, and 206, the rollers 204 and 205 being mounted upon the shafts numbered, respectively, 207 and 208, which are rigidly journaled in the frames 209, supported from the main frame of the machine. The roller 206 is suspended upon the oscillating arms 210, which are hung from the shaft 208 and are connected by the shaft 211 of said roller 206. When the cigarette is being rolled, the roller 206 is in its forward position in close relation to the surface of the belt 101, Figs. 29, 30, and 31, and at such time the roller 200 is in its lower position and operates as a pressure-roller upon the top of the cigarette being rolled, as shown in Fig. 31. After the cigarette has been rolled the roller 200 elevates and the roller 206 retreats rearward, in order that the belt 201 adjacent to said roller 206 may separate from the belt 101 and allow the rolled cigarette to fall to the trimming devices, hereinafter to be described.

The belt 201 is provided with a tension-roller 212, which is mounted in the lower bifurcated ends of the pivotally-mounted frame 213, Figs. 8 and 9, which is provided with the arm 214 and the weight 215, the latter being adjustable on said arm by means of the set-screw 216. The frame 213 is mounted upon the shaft 207 and carries between its lower ends the roller 212, which is below the belt 201 and by means of the weight 215 exerts an upward tension upon the said belt, whereby the latter is always kept taut, notwithstanding the variable positions the roller 206 assumes from time to time. The roller 206 is, as above described, mounted upon the shaft 211, and this shaft has connected to it the rod 217, Fig. 2, which extends rearward to the substantially vertical arm 218, which is mounted upon the shaft 64 and has its lower end in engagement with the cam 219, mounted on the shaft 66. The cam 219, acting upon the arm 218, imparts to the rod 217 at the proper time a reciprocating motion forward and backward, the forward motion carrying the roller 206 and the belt thereon forward against the belt 101, thereby delivering it to a position in which the cigarette may be rolled between the said belts or aprons 101 and 201. The rearward motion of the arm 218 and rod 217 has the effect of drawing the roller 206 rearward, and this occurs only after the cigarette has been rolled and it is desired to afford space between the belts 101 and 201 for the cigarette to escape. When the roller 206 moves rearward, the tension-roller 212 will ascend under the force of the weight 215 and take up the slack in the apron 201, thereby, notwithstanding the rearward motion of the roller 206, keeping the said belt 201 taut. When the roller 206 moves forward, its thrust is positive and its force sufficient to overcome the effect of the weight 215, whereby the roller 212 is caused to lower and the previous slack in the belt is taken up by the forward motion of the roller 206, as shown in Figs. 8 and 9. At the time when the charge-box 76 is to descend to deliver the charge of tobacco to be rolled the roller 200 is in its upward position in order to leave the entrance to said space entirely open and free to receive the tobacco, Fig. 30, and after the tobacco has entered said space between the belts 101 and 201 the roller 200 descends to close upon the tobacco and aid in the rolling thereof, as shown in Fig. 31. The roller 200 is mounted upon the shaft 220, Fig. 20, which is suspended from the shaft 208 by means of the links or arms 221. One end of the shaft 220 is provided with the gear-wheel 222, which is in engagement with the gear-wheel 223 and receives its motion therefrom for the purpose of causing a revolving action in the roller 200. The oscillating motion of the arms 221 and shaft 220 in order to elevate and depress the roller 200 is secured by interengaging segments 224 and 225, those numbered 224 being integral with the arms 221, while the segments 225 are mounted on the shaft 226, upon which is secured the crank-arm 227, connected at its upper end to the rod 228, Figs. 1, 2, 3, 8, and 12, which extends rearward and is connected with the substantially vertical arm 229, the latter being mounted upon the shaft 64 and having its lower end in engagement with the cam 230, mounted on the shaft 66. The cam 230 operates to reciprocate the rod 228 and through said rod to impart an oscillating movement to the crank-arm 227 and segment 225, the motion of the latter operating to effect an oscillation of the segment 224 and the upward and downward movement of the roller 200, connected with said segment 224.

It will thus be understood that the charge of filler-tobacco is deposited by the box 76 on the belt 101 adjacent to the space between the converging surfaces of the belts 101 and 201, as shown in Fig. 30, and that the wrapper for the charge of tobacco is carried by said belt 101 to said charge of tobacco, as shown in Fig. 31, after the latter has reached said space and been partly rolled therein, and thereupon the said wrapper is rolled upon said tobacco by said converging surfaces of the belts 100 and 201 and the roller 200 to form the cigarette. There is in actual construction a small space left between the roller 200 and the adjoining surface of the belt 101 in order that the paste upon the edge of the wrapper may not come into contact with said roller 200. With the rolling of each cigarette the roller 200 ascends and the roller 206 retreats rearward, and upon the escape of the rolled cigarette the roller 206 reassumes its normal position in close relation to the belt 101, and after another charge of tobacco has been deposited on the apron or belt 101 and carried to the space between the belts 101 and 201 the roller 200 will again descend and the operation of rolling another cigarette will take place.

The rolling belt-rollers 204 and 205 receive their intermittent motion from the shaft 231, Figs. 2, 3, 8, and 12, through the intermediate gears 232, 233, 234, 235, 236, 237, 238, and 239, Figs. 1, 2, 3, 9, 12, and 20, the last-mentioned gear being in engagement with the gear-wheel 223, which is directly on the shaft 208 of the roller 205. The shaft 208 of the roller 205 extends outward laterally beyond the frames 209, Fig. 20, and is provided with the gear-wheel 245, which is in engagement with the gear-wheel 246, mounted upon the shaft of the roller 138 for the belt 101, and thereby motion is communicated to said roller 138 and through it to the belt 101. Thus the belts 101 and 201 have a simultaneous movement imparted to them from the main driving-shaft 66, which carries the pinion 247, in engagement with the gear-wheel 248, the latter being on the shaft 64 and engaging the aforesaid gear-wheel 232, which is one of the train of gears leading directly to the shaft 208, carrying the roller 205 and also the gear-wheel 245, which engages the gear-wheel 246, located on the shaft of the front roller 138 for the belt 101. The gear 234 is a segment, and hence the motion communicated from it to the gears leading to the belt-rollers 138 and 204 205 will be intermittent.

The above-described gearing for operating the belts 101 201 are satisfactory, but may be substituted by other forms of gearing, if desired. The shaft 66 also carries the driving gear-wheel 302, hereinafter mentioned.

*Cigarette-trimming mechanism.*—After the rolling of the cigarette between the converging surfaces of the belts 101 and 201 and below the roller 200 it is desirable that the ends of the cigarette should be nicely and evenly trimmed, and hence at a suitable point below the converging surfaces of the belts 101 and 201 cutting mechanism (more fully shown in Figs. 8, 9, 23, 24, 25, 31, 32, and 33) is provided to receive the cigarette and effect the trimming of its ends. The rolled cigarette when it escapes from between the belts 101 and 201 will fall within the pockets 250 of the knives 251, which have an oscillating motion and are mounted upon the shaft 252, extending transversely across the machine below the belt 201. The normal position of the knives 251 is that in which they are illustrated in Figs. 31 and 32, in which it will be observed that the pockets 250 open upward and are directly below the space between the belts 101 and 201 in order to receive the cigarette, and upon the cigarette entering the pockets 250 the knives 251 turn rearward and their edges move against the guiding segmental plates 253 and circular cutters 265, which sever the ends of the cigarette. The plates 253 have the effect of moving the cigarette inward toward the base of the pockets 250, and thus aid in effecting the severance of those portions of the ends of the cigarette which extend outward toward the pockets 250. The trimmed cigarette will fall into any suitable receptacle and the trimmed ends cut from the cigarette will fall into the box 254, which operates as a chute to deliver the same to the braking-rollers, whereby they are macerated and prepared for use as filler-tobacco, as hereinafter described. In front of and on a lower elevation than the shaft 252 is mounted the shaft 255, having the spring 256 and carrying the arms 257, which extend rearward and have an upward tension against the collars or sleeves 258, to which the knife-blades 251 are secured, and which are directly upon the shaft 252 and serve as the means for mounting said blades upon said shaft. The arms 257 have a constant spring-tension against the said collars or sleeves 258. The shaft 252, carrying the knives 251, has an oscillating motion imparted to it by means of the gear-wheel 259, secured upon its end and engaged by the rocking segment 260, Fig. 23, which is mounted upon the shaft 261 and receives its motion from the main driving-shaft 66, Fig. 12, by means of the intermediate rod 262, arm 263, and cam 264, the latter being directly upon the said shaft 66, while the arm 263 is fulcrumed upon the shaft 64. When the segment 260 is moved upward, it will, through the gear-wheel 259, turn the said knives 251 upward to receive the cigarette, and when the segment 260 is moved downward it will, through the gear-wheel 259, move the knives 251 rearward and downward against the plates 253 and cutters 265, cutting off or trimming the ends of the cigarette, the portions trimmed from the cigarette falling into the box 254 and the finished cigarette falling into any suitable receptacle placed below the shaft 252. The cutters 265 receive their motion from the shaft 252 through the intermediate gearing 266 267. (Shown in Fig. 23.) The arms 257 are to prevent the cigarette from sticking in or adhering to the pockets 250, and they eject the cigarette from said pockets by being turned downward to the position shown in Fig. 33 (when the knives 251 are in their downward position) by means of the cam 268 on the shaft 252, turning against the arm 269, rigid on the shaft 255, as shown in Figs. 23 and 25.

*Braking mechanism.*—The ends trimmed from the cigarette fall within the box 254, which operates as a chute to deliver the same to the braking-rollers 275 and 278, Figs. 26, 27, and 28, which are journaled between the sides of the machine upon the shafts 279 and 280 and are directly over a receptacle of any usual kind, such as a box, (not shown,) suitably arranged in convenient position to receive the tobacco after the same has been acted upon by the said rollers 275 and 278. The rollers 275 and 278 revolve toward one another, and the tobacco from the trimmed ends of the cigarettes is carried between them. The roller 275 has over its entire surface the serrations, Fig. 27, in the form of teeth having blunt outer ends 282, inclined sides 283, and the practically straight sides 284, while the roller 278 is smaller than the roller 275 and is provided with the serrations extending in lines entirely around the same, and the teeth of which are adapted to pass between the teeth of the roller 275. The teeth or serrations on the roller 278 have their inclined sides facing the roller 275, and hence the inclined sides of the teeth of both said rollers 275 and 278 move toward one another and carry the trimmed cigarette ends between them. The form of the teeth on the rollers 275 and 278 are of importance in that they insure the breaking up of the said ends and the loosening of the tobacco therein without destroying the fiber of said tobacco, but leaving the same in suitable condition to be again fed as filler-tobacco to the machine. The shaft 279 of the roller 275 receives its motion from the gear-wheel 232, which engages the gear-wheel 286, secured directly upon said shaft 279, and the shaft 279 communicates an intermittent motion to the shaft 280 of the roller 278 through the medium of the wheel 287 on said shaft 279 and the pin 288, carried by said wheel, engaging the ratchet-wheel 289, located on the shaft 280. The shafts 279 and 280 are supported in side plates 290 and 291, and between these plates is mounted the shaft 231, which carries the gear-wheel 232 above referred to. The trimmed ends of the cigarettes are carried between the said rollers 275 and 278 and thence fall into any suitable receptacle, from which they may be removed from time to time as may be required. Below the roller 275 is arranged the brush-roller 292, which contacts with the teeth of the roller 275 and operates to clean the same, whereby the tobacco is prevented from being carried around by the said roller 275.

Operation: The operation of the several operative parts or combinations of the machine has been pointed out in the description of the construction of said parts and combinations, and hence a lengthy description of the operation will not be required. It may be said, however, that the filler-tobacco is carried inward upon the belt 50 and below the pressure-roller 54, the said belt having an intermittent motion, and that the separate charges of filler-tobacco for the cigarettes are severed by the knife 56 and fall into the box 76, by which they are in succession carried to the rolling mechanism. The wrappers for the cigarettes are cut by means of the punch 108 and die 104, and by the latter, while held distended by air-suction, delivered to the lower side of the perforated transferring-belt 101, which is connected with air-suction apparatus and receives the wrappers from the die 104 and delivers them in their distended condition, after receiving the paste on one edge, to the rolling mechanism. The rolling mechanism, as above described, consists of the inner end of the said transferring-belt 101 and the adjoining edge of the rolling-belt 201, said belts coöperating with the pressure-roller 200. The cigarettes are rolled between the converging surfaces of the belts 101 and 201 under the pressure of the roller 200. After the cigarette has been rolled the lower roller 206 moves rearward to permit the escape of the rolled cigarette to the pockets 250 in the trimming-knife 251, and thereupon the pressure-roller 200 elevates to permit of the entrance to the rolling means of another charge of filler-tobacco, and the roller 206 returns to its position in close relation to the belt 101, in order that the succeeding charge of tobacco may be rolled within its wrapper, carried inward by the belt 101. The rolled cigarette having entered the pockets 250 of the knives 251, is carried rearward by the oscillating motion of said knives against the coöperating edges of the cutters 265 and also against the plates 253, which keep the cigarette pressed into the said pockets and insure the severance of the extreme ends of the cigarettes by said cutters. The trimmed cigarette falls into any suitable receptacle to receive the same, while the ends trimmed from the cigarettes fall into the box or chute 254 and thence pass to the rollers 275 and 278, between which they are carried and disintegrated, the product falling into any suitable receptacle in condition to be used as filler-tobacco for the feeding-apron 50.

The machine made the subject hereof thus not only feeds the filler-tobacco inward and cuts the wrappers for the cigarettes, but automatically removes the cut wrappers from the die and conveys them inward to the rolling mechanism, to which the separate charges of tobacco are automatically fed to receive said wrappers. The rolled cigarettes by automatic means are trimmed at their ends, and the removed portions of said ends are treated by the rollers 275 278, and the tobacco thereof, without destroying its fiber, is reprepared for the feeding-apron of the machine. The machine is thus entirely complete in itself, and all of its parts are automatic. An operator is required to feed the tobacco upon the apron A as smoothly as may be, and another operator is required to feed the leaf upon the die 104, in order that the wrappers may be automatically cut therefrom.

The power for operating the machine may be applied in any suitable manner or in any of the many known ways in this art. The driving-shaft will be provided usually with a suitable belt-wheel 300, Fig. 1, upon the shaft of which may be arranged a pinion-wheel 301 in engagement with the gear-wheel 302 on the shaft 66, carrying the driving-gears and cams, and the shaft 66 will be provided with any suitable clutch mechanism 303 to be operated by a suitable treadle connected with the arm 304, Figs. 1, 3, and 4, for stopping and starting the machine. This clutch mechanism is shown in various patents heretofore granted to me and a specific description of the same will probably be here unnecessary.

The word "porous" and the word "perforated" as applied to the transferring-belt are used in this application synonomously and in a generic sense to embrace a transferring-belt of any material having any kind of holes through it enabling the air-suction to bind the wrapper thereon.

What I claim as my invention, and desire to secure by Letters Patent, is—

1. In a machine of the character described, rolling mechanism for rolling the cigarettes, the cutting-die for cutting the wrappers for the cigarettes, the oscillating arm carrying the said die, suction apparatus connected with said die for holding the leaf distended while the wrapper is being cut, means for oscillating said arm carrying said die, and means in the path of said die for pressing the leaf thereon to effect the cutting of the wrapper, combined with transferring means connected with air-suction for taking the cut wrapper from the die when the latter is at its inward position and transferring said wrapper while held by air-suction to the rolling mechanism, means for cutting off the air from said die when the latter is to deliver the cut wrapper to the transferring means, and means cutting off the air-suction within said transferring means from the wrapper upon the delivery of the latter to the rolling mechanism; substantially as set forth.

2. In a machine of the character described, rolling mechanism for rolling the cigarette, the cutting-die by which the wrappers are cut from the leaf, air-suction apparatus connected with said die, the table surrounding said die, the oscillating arm carrying said die and table, and means for oscillating said arm, combined with means in the path of said die for pressing the leaf thereon to effect the cutting of the wrappers, transferring means connected with air-suction adapted to remove the cut wrapper from the die when the latter is at its inward position and deliver said cut wrapper to the rolling mechanism, means for cutting off the air from said die when said transferring means is to take the wrapper therefrom, and means cutting off the air-suction within said transferring means from the wrapper upon the delivery of the latter to the rolling mechanism; substantially as set forth.

3. In a machine of the character described, the rolling mechanism for rolling the cigarette, the die for cutting the wrappers for the cigarettes, air-suction apparatus for holding the leaf thereon preparatory to the cutting of the wrapper therefrom, means for moving said die outward to receive the leaf and then inward to surrender the cut wrapper, and means in the path of said die for automatically pressing the leaf thereon to effect the cutting of the wrappers, combined with transferring means also connected with air-suction adapted to remove the cut wrapper from said die when the latter is at its inward position and deliver the same to the rolling mechanism; substantially as set forth.

4. In a cigarette-making machine, the feed-belt for feeding the filler-tobacco, the rollers supporting said belt, mechanism for imparting to said belt an intermittent motion, and the knife for severing the charges of tobacco for the cigarettes, combined with cigarette-rolling mechanism, the oscillatory charge-box intermediate said mechanism and the inner end of said feed-belt, the oscillatory arms carrying said charge-box and rigidly secured to the hinged bottom thereof, means for oscillating said arms, and means for arresting said box during the downward movement of said arms without stopping said arms whereby the bottom of said box is opened downward to discharge the filler-tobacco; substantially as set forth.

5. In a cigarette-making machine, the feed-belt for the filler-tobacco, mechanism for imparting to the belt an intermittent motion, the knife for severing the charges of tobacco for the cigarettes, and cigarette-rolling mechanism, combined with the charge-box, the oscillatory arms carrying said charge-box and rigidly secured to the hinged bottom thereof, the segmental gearing for oscillating said arms, the stop carried by the body of said box, and the contact which is in the path of said stop for arresting the body of said box during the downward movement of said arms without stopping said arms, whereby the bottom of said box is opened downward to discharge the filler-tobacco; substantially as set forth.

6. In a cigarette-making machine, the feed-belt for filler-tobacco, the knife for severing the separate charges thereof, cigarette-rolling mechanism, and means for delivering the said charges to the rolling mechanism, combined with the porous or perforated transferring-belt, suction apparatus connected therewith, and means for pasting the edge of the wrapper while held by said belt previous to its transfer thereby to the rolling mechanism; substantially as set forth.

7. In a cigarette-making machine the feed-belt for filler-tobacco, the knife for severing the charges therefrom, means for rolling the cigarette, and means for delivering the charges of tobacco to the rolling mechanism, combined with the porous or perforated belt for feeding the cut wrapper to the rolling mechanism, air-suction apparatus connected with said belt, means for applying paste to the edge of the wrapper while held on said belt, and means for trimming the ends of the cigarette after leaving said rolling mechanism; substantially as set forth.

8. In a cigarette-making machine, the feed-belt for filler-tobacco, the knife for severing the separate charges therefrom, the rolling mechanism, and means for delivering the separate charges of filler-tobacco to the rolling mechanism, combined with the punch and die for cutting the wrappers, means for moving the die inward to deliver its wrapper, air-suction apparatus connected with said die, and means connected with air-suction for removing the wrapper from said die and delivering it to the rolling mechanism; substantially as set forth.

9. In a cigarette-making machine, the feed-belt for filler-tobacco, the knife for severing the separate charges of the filler-tobacco fed inward on said belt, the rolling mechanism, and means for conveying the severed charges of tobacco to said mechanism, combined with the punch and die for cutting the wrappers, air-suction apparatus connected with said die for holding the leaf, means for moving said die inward to deliver its wrapper, and transferring means also connected with air-suction for removing the cut wrapper from said die and delivering it to the rolling mechanism, said transferring means being capable of depression upon said die when engaged in taking the wrapper therefrom; substantially as set forth.

10. The die containing the perforated yielding platen, the hollow oscillating arm carrying said die, means for imparting an oscillating movement to said arm, and suction apparatus connected with said arm and provided with a valve, combined with the punch adapted to coöperate with said die, and means for actuating said punch; substantially as set forth.

11. The die having the perforated platen and surrounded by a table, the hollow arm carrying said table and die, means for moving said arm, and air-suction apparatus connected with said arm and having a valve, combined with the punch for coöperating with said die, means for actuating said punch, and means for locking said die in position below said punch and then releasing the same; substantially as set forth.

12. In a cigarette-making machine, the rolling mechanism, the die containing the perforated platen, the hollow arm carrying said die, means for moving said arm, air-suction apparatus connected with said arm, the punch for coöperation with said die when the latter is below the same, and means for actuating said punch, combined with the porous or perforated apron for transferring the cut wrapper from said die to the rolling mechanism, and means for pressing said apron against said die to take the wrapper therefrom; substantially as set forth.

13. In a machine of the character described, rolling mechanism for rolling the cigarettes, the die for cutting the wrappers for said cigarettes, the table surrounding said die, air-suction apparatus connected with said die, means for moving said die and table outward toward the operator to receive the leaf and then inward toward the operative mechanism of the machine to surrender the cut wrapper, and means in the path of said die for automatically pressing the leaf thereon to effect the cutting of the wrapper, combined with transferring means also connected with air-suction and adapted to take the cut wrapper from said die when the latter is at its inward position and deliver the same to the rolling mechanism; substantially as set forth.

14. In a machine for making cigarettes, the feed-belt for the filler-tobacco, the knife for severing the charges therefrom, the rolling mechanism, and means for conveying the separate charges of tobacco to the rolling mechanism, combined with the die for cutting out the wrappers, means for moving said die inward with its wrapper, the endless porous belt for removing the wrapper from the die and conveying it to the rolling mechanism, suction apparatus connected with said belt, and the plunger between the parts of said transferring-belt for pressing the latter against the said die to take the wrapper therefrom; substantially as set forth.

15. In a cigarette-making machine, the feed-belt for filler-tobacco, the knife for severing the charges therefrom, the rolling mechanism, and means for conveying the severed charges of tobacco to said mechanism, combined with the die for cutting the wrappers, means for moving said die inward, the endless porous transferring-belt, air-suction apparatus connected therewith, the plunger between the sections of said belt and corresponding substantially with the outline of said die, means for pressing the plunger against the belt to cause the latter to engage the wrapper on the die, and means for applying paste to the edge of the wrapper while in line with the said plunger; substantially as set forth.

16. In a machine of the character described, rolling mechanism for rolling the cigarettes, the die for cutting the wrappers for the cigarettes, the yielding platen in said die, air-suction apparatus connected with said die, and means for effecting the outward movement of said die to receive the leaf from which the wrapper is to be cut and then the inward movement of said die to surrender the cut wrapper, combined with means in the path of said die for automatically pressing the leaf thereon to effect the cutting of the wrappers, and transferring means connected with air-suction for removing the wrapper from the die when the latter is at its inward position and delivering the same to the rolling mechanism; substantially as set forth.

17. For use in connection with cigarette-making machines, to reprepare the trimmed ends, the revoluble serrated rollers, and means for causing said rollers to revolve toward one another, the teeth of one of said rollers passing between the teeth of the other roller, combined with the chute over one of said rollers to receive the trimmed ends and retain the same until they are moved by said roller to the other roller; substantially as shown and described.

18. In a cigarette-making machine, the feed-belt for filler-tobacco, the knife for severing the separate charges therefrom for the cigarettes, cigarette-rolling mechanism, and means for conveying the said charges of filler-tobacco to said mechanism, combined with the endless porous or perforated belt for feeding the wrappers while in a distended condition to said rolling mechanism, air-suction apparatus connected with said belt, means for applying paste to one edge of the wrapper while held by said belt, and means for imparting to said belt an intermittent motion; substantially as set forth.

19. For use in connection with cigarette-making machines, to reprepare the trimmed ends, the revoluble serrated rollers, and means for causing the said rollers to revolve toward one another, the teeth of one of said rollers passing between the teeth of the other roller and the inclined sides of the teeth of said rollers facing and moving toward one another as said rollers revolve, combined with the chute over one of said rollers to receive the trimmed ends and retain the same until said ends are moved by the roller below the chute to the other roller; substantially as shown and set forth.

20. In a cigarette-making machine, the rolling mechanism, and means for feeding the charges of filler-tobacco thereto, combined with the die for cutting the wrappers, air-suction apparatus connected with said die, means for moving said die inward, the endless porous or perforated belt for receiving the wrapper from said die when the latter is at its inward position and delivering the same to the rolling mechanism, air-suction apparatus connected with said belt, and means for cutting the air off from said die at the time the belt is to take the wrapper therefrom; substantially as set forth.

21. In a cigarette-making machine, the feed-trough for the filler-tobacco, the knife for severing the charges thereof, and cigarette-rolling mechanism, combined with the charge-box, the oscillatory arms carrying said charge-box and rigidly secured to the hinged bottom thereof, the arm carried by said box, the adjusting-screw carried by said arm, the stop for contact with said screw to arrest said box while said arms continue downward to open the bottom from said box, and segmental gearing with intermediate connections for oscillating said arms from the main driving-shaft; substantially as set forth.

22. In a cigarette-making machine, the rolling mechanism, and mechanism for feeding the charges of filler-tobacco thereto, combined with the die for cutting the wrappers, air-suction apparatus connected with said die, means for moving the die inward, the endless perforated belt for transferring the cut wrapper from the said die to the rolling mechanism, air-suction apparatus connected with said belt, the plunger between the sections of said belt, means for pressing said plunger against the belt and moving the latter against said die when the latter is at its inward position, the supporting-rollers for said belt, and the yielding tension-bearing for one of the said rollers of said belt; substantially as set forth.

23. In a cigarette-making machine, the rolling mechanism, means for feeding the charges of filler-tobacco thereto, and means for feeding the wrappers to said rolling mechanism, combined with the oscillating knives having the pockets to receive the cigarette from said rolling mechanism, the coöperating cutters for said knives, the arms having a spring-tension against the bearings of said knives, means to operate said arms to eject the cigarette, and the gearing connected with the shaft of said knives for oscillating the same; substantially as set forth.

24. In a cigarette-making machine, the rolling mechanism, means for feeding the filler-tobacco thereto, and means for feeding the wrappers to said rolling mechanism, combined with the knives for trimming the ends of the rolled cigarettes, and the pair of serrated rollers receiving said trimmed ends and acting upon the same to reprepare the tobacco for use in making cigarettes; substantially as set forth.

25. In a cigarette-making machine, the rolling mechanism, means for feeding the filler-tobacco thereto, and means for feeding the wrappers to said rolling mechanism, combined with the cutters located below said rolling mechanism to receive the rolled cigarettes and cut the ends therefrom, the chute receiving said ends, the serrated roller directly below the said chute, the coöperating roller having small serrations at the side of the said first-mentioned roller, and means for revolving said rollers toward one another for the purpose of carrying said cigarette ends between the same; substantially as set forth.

26. For use in connection with cigarette-making machines to reprepare the trimmed ends, the revoluble serrated rollers, and means for causing said rollers to revolve toward one another, the teeth of one of the rollers having the blunt ends, and the other roller having the small teeth passing between the larger teeth of the first roller; substantially as set forth.

27. For use in connection with cigarette-making machines to reprepare the trimmed ends, the serrated rollers, and means for causing the said rollers to revolve toward one another, one of the rollers being smaller in diameter than the other roller and the teeth of the latter roller having the blunt ends, while the said smaller roller has the lines of teeth adapted to pass between the larger teeth of the larger roller; substantially as set forth.

28. For use in connection with cigarette-making machines to reprepare the trimmed ends, the braking-rollers, adapted to revolve toward one another and having serrated surfaces, one of the rollers being smaller than the other roller and having its teeth in line with the spaces between the teeth of the said other roller, combined with means for rotating said larger roller and means for imparting to said smaller roller an intermittent motion from said larger roller; substantially as set forth.

29. For use in connection with cigarette-making machines, to reprepare the trimmed ends, the revoluble serrated rollers adapted to revolve toward one another, the teeth of one of said rollers passing between the teeth of the other roller and the inclined sides of the teeth of said rollers facing and moving toward one another as said rollers revolve, combined with means for imparting a constant revolving motion to one of said rollers and an intermittent revolving motion to the other of said rollers, and the chute over one of said rollers to receive the trimmed ends and retain the same until said ends are moved by the roller below the chute to the other roller; substantially as set forth.

30. In a cigarette-making machine, cigarette-rolling mechanism, and means for delivering the charges of filler-tobacco to the rolling mechanism, combined with the porous or perforated transferring-belt, suction apparatus connected therewith, and means for pasting the edge of the wrapper while held by said belt previous to its transfer thereby to the rolling mechanism; substantially as set forth.

31. In a cigarette-making machine, means for rolling the cigarette, and means for delivering the charges of tobacco to the rolling mechanism, combined with the porous or perforated belt for feeding the cut wrapper to the rolling mechanism, air-suction apparatus connected with said belt, means for applying paste to the edge of the wrapper while held on said belt, and means for trimming the ends of the cigarette after leaving said rolling mechanism; substantially as set forth.

32. In a cigarette-making machine, the rolling mechanism, combined with the endless perforated transferring-belt for delivering the cut wrappers, air-suction apparatus connected with said belt, the plunger within said belt for depressing the latter against the wrapper to be received by it, the strip carried by said plunger below the said belt to serve as a base for the edge of the wrapper, and means for applying paste to said edge of the wrapper while held on said strip; substantially as set forth.

33. The die having its side and end sections independent of one another and each of said sections having the inclined outer edges, the clamping-screws for said sections, and the adjusting-screws acting against said inclined edges of said sections, combined with the yielding platen within said die, air-suction apparatus connected with said die, and the automatically-operating punch for said die; substantially as set forth.

34. In a cigarette-making machine, the rolling mechanism, and means for feeding the charges of filler-tobacco thereto, combined with the oscillating knives having the pockets to receive the cigarette from said rolling mechanism, the coöperating cutters for said knives, the oscillating arms for ejecting the trimmed cigarette from said pockets, the means for actuating said arms, and the gearing for oscillating the said knives and rotating said cutters; substantially as set forth.

35. In cigarette-making machines to reprepare the trimmed ends, the revoluble serrated braking-rollers, and means for causing said rollers to revolve toward one another, the teeth of one of the rollers having the blunt ends, inclined sides and substantially straight sides, and the other roller having the small teeth passing between the larger teeth of the first roller; substantially as set forth.

36. In cigarette-making machines to reprepare the trimmed ends, the serrated braking-rollers, and means for causing the said rollers to revolve toward one another, one of the rollers being smaller in diameter than the other roller and the teeth of the latter roller having the blunt ends, inclined sides and substantially straight sides, while the said smaller roller has the lines of teeth adapted to pass between the larger teeth of the larger roller; substantially as set forth.

Signed at New York, in the county of New York and State of New York, this 4th day of June, A. D. 1896.

JOHN R. WILLIAMS.

Witnesses:
CHAS. C. GILL,
E. JOS. BELKNAP.